US012562542B2

(12) United States Patent
Galvanauskas et al.

(10) Patent No.: US 12,562,542 B2
(45) Date of Patent: Feb. 24, 2026

(54) SPECTRALLY AND COHERENTLY COMBINED LASER ARRAY

(71) Applicant: The Regents of the University of Michigan, Ann Arbor, MI (US)

(72) Inventors: Almantas Galvanauskas, Ann Arbor, MI (US); Theodore Mathew Whittlesey, St. Clair, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 877 days.

(21) Appl. No.: 17/765,787

(22) PCT Filed: Oct. 6, 2020

(86) PCT No.: PCT/US2020/054401
§ 371 (c)(1),
(2) Date: Mar. 31, 2022

(87) PCT Pub. No.: WO2021/071836
PCT Pub. Date: Apr. 15, 2021

(65) Prior Publication Data
US 2022/0344886 A1 Oct. 27, 2022

Related U.S. Application Data

(60) Provisional application No. 62/911,319, filed on Oct. 6, 2019.

(51) Int. Cl.
*H01S 3/067* (2006.01)
*G02B 27/10* (2006.01)
(Continued)

(52) U.S. Cl.
CPC ........ *H01S 3/0057* (2013.01); *G02B 27/1086* (2013.01); *H01S 3/06754* (2013.01);
(Continued)

(58) Field of Classification Search
CPC .. H01S 3/0057; H01S 3/1305; H01S 3/10053; H01S 3/1307; H01S 3/06754; H01S 3/2383; H01S 3/2391
See application file for complete search history.

(56) References Cited

U.S. PATENT DOCUMENTS 5,847,863 A * 12/1998 Galvanauskas ....... H01S 3/0057
359/333
6,200,309 B1 * 3/2001 Rice ........................ A61N 5/062
606/9

(Continued)

FOREIGN PATENT DOCUMENTS

EP          1148769 A2 * 10/2001 ............... H05G 2/00
WO    WO-2012028287 A2 * 3/2012 ........... H01S 3/0057
(Continued)

OTHER PUBLICATIONS

Hann et al., "Coherent combination of ultrafast fiber amplifiers", 2016, Journal of Physics B: Atomic and Molecular Physics, 49 (6), pp. 062004. (Year: 2016).*
(Continued)

*Primary Examiner* — Joshua King
(74) *Attorney, Agent, or Firm* — Lempia Summerfield Katz LLC

(57) ABSTRACT

A laser system includes a signal source configured to generate input pulses, a diffraction grating module configured to stretch and split the input pulses into a plurality of spectral channels, a set of phase control devices, each phase control device being configured for spectral phase control of a respective spectral channel of the plurality of spectral channels, a power amplifier array of amplifier modules, each amplifier module of the power amplifier array being configured to amplify a respective spectral channel of the plurality of spectral channels, a spectral combiner configured to spectrally combine the plurality of spectral channels
(Continued)

BW input          Stretched          Stretched and spectrally sliced

1) Spectral slicing into N channels of a solitary stretched pulse:

$\Delta T_{stretched}/N$ $\Delta T_{stretched}$

2) Spectral slicing into N channels of multiple overlapped stretched pulses:

$\Delta T_{stretched}/N$   $\Delta T_{stretched}/N$ $\Delta T_{stretched}$          $\Delta T_{stretched}$ via diffraction grating-based pulse compression, and a feedback controller coupled to the spectral combiner to provide feedback to the set of phase control devices for pulse shaping.

22 Claims, 24 Drawing Sheets

(51) Int. Cl.
  *H01S 3/00*        (2006.01)
  *H01S 3/13*        (2006.01)
(52) U.S. Cl.
  CPC ........ *H01S 3/1307* (2013.01); *H01S 3/06758*
          (2013.01); *H01S 3/1305* (2013.01)

(56)          References Cited

U.S. PATENT DOCUMENTS

| | | | | |
|---|---|---|---|---|
| 6,256,141 | B1 * | 7/2001 | Kosaka | H04J 14/0201 |
| | | | | 359/337.13 |
| 6,366,356 | B1 * | 4/2002 | Brosnan | H01S 3/067 |
| | | | | 356/477 |
| 6,459,766 | B1 * | 10/2002 | Srinivasan-Rao | H05G 2/00 |
| | | | | 378/138 |
| 6,882,781 | B2 * | 4/2005 | Ionov | H01S 3/2383 |
| | | | | 385/39 |
| 7,088,743 | B2 * | 8/2006 | Rice | H01S 3/1307 |
| | | | | 372/27 |
| 7,199,924 | B1 * | 4/2007 | Brown | H01S 3/2383 |
| | | | | 398/87 |
| 8,150,271 | B1 * | 4/2012 | Brennan, III | H01S 3/0057 |
| | | | | 398/189 |
| 8,531,761 | B2 * | 9/2013 | Chann | G03F 7/7085 |
| | | | | 359/333 |
| 8,929,408 | B1 | 1/2015 | Diels et al. | |
| 9,735,537 | B1 * | 8/2017 | Rothenberg | G02B 27/0927 |
| 9,865,986 | B2 | 1/2018 | Galvanauskas | |
| 2002/0131164 | A1 * | 9/2002 | Palese | H01S 3/06754 |
| | | | | 359/349 |
| 2005/0128554 | A1 * | 6/2005 | Wickham | H01S 3/0057 |
| | | | | 359/237 |
| 2005/0232317 | A1 * | 10/2005 | Dantus | H01J 49/164 |
| | | | | 372/32 |
| 2008/0037028 | A1 * | 2/2008 | Cheung | H01S 3/2383 |
| | | | | 356/478 |
| 2008/0084598 | A1 * | 4/2008 | Rothenberg | B23K 26/0613 |
| | | | | 359/238 |
| 2008/0084605 | A1 * | 4/2008 | Rothenberg | B23K 26/067 |
| | | | | 359/337.21 |
| 2009/0141341 | A1 * | 6/2009 | Gaudiosi | H01S 3/2308 |
| | | | | 359/341.1 |
| 2009/0219610 | A1 * | 9/2009 | Mourou | H01S 3/0057 |
| | | | | 359/341.1 |
| 2010/0142573 | A1 * | 6/2010 | Minden | H01S 3/2383 |
| | | | | 372/29.016 |
| 2011/0032604 | A1 * | 2/2011 | Rothenberg | G02B 6/04 |
| | | | | 359/341.4 |
| 2011/0292498 | A1 * | 12/2011 | Chann | G03F 7/70033 |
| | | | | 359/341.1 |
| 2011/0305250 | A1 * | 12/2011 | Chann | G02B 19/0095 |
| | | | | 372/6 |
| 2012/0188626 | A1 * | 7/2012 | Rothenberg | H01S 3/06712 |
| | | | | 359/239 |
| 2013/0315271 | A1 * | 11/2013 | Goodno | H01S 3/1307 |
| | | | | 372/31 |
| 2015/0086217 | A1 * | 3/2015 | Galvanauskas | H01S 3/2383 |
| | | | | 398/188 |
| 2015/0253504 | A1 | 9/2015 | Sanghera et al. | |
| 2016/0315441 | A1 * | 10/2016 | Galvanauskas | H01S 3/005 |
| 2018/0024415 | A1 * | 1/2018 | Mainz | G01J 3/453 |
| | | | | 372/25 |
| 2019/0190225 | A1 * | 6/2019 | Goodno | H01S 3/10084 |

FOREIGN PATENT DOCUMENTS

| | | | |
|---|---|---|---|
| WO | WO-2017190930 A1 * | 11/2017 | |
| WO | WO-2019220430 A2 * | 11/2019 | .......... G02B 27/141 |

OTHER PUBLICATIONS

Weiner et al., "Synthesis of Phase-Coherent, Picosecond Optical Square Pulses", Mar. 1986, Optics Letters, vol. 11, No. 3, 153-155. (Year: 1986).*

Oksenhendler et al., "Pulse-Shaping Techniques Theory and Experimental Implementations for Femtosecond Pulses", 2010, Advances in Solid-State Lasers: Development and Applications, chap 16, 348-386. (Year: 2010).*

Zhang et al., "Transmission and Full-Band Coherent Detection of Polarization-Multiplexed All-Optical Nyquist Signals Generated by Sinc-Shaped Nyquist Pulses", Sep. 1, 2015, Scientific Reports, 5:13649, 1-13. (Year: 2015).*

International Search Report and Written Opinion of the International Searching Authority in International Patent Application No. PCT/US20/54401, dated Feb. 26, 2021, 9 pages.

Klenke et al, "Coherently combined 16-channel multicore fiber laser system." Optics Letters vol. 43, Issue 7, pp. 1519-1 522 (Date of Publication: Mar. 5, 2018) [retrieved on Nov. 26, 2020]. Retrieved from the Internet: https://doi.org/10.1364/OL.43.001519.

Ruppe III, "Theoretical and Experimental Foundations of Coherent Pulse Stacking Amplification" University of Michigan, Horace H. Rackham School of Graduate Studies; (online Jan. 31, 2018).

Zhou, "Coherent Combining of Optical Pulses in Spatial. Spectral and Time Domains" University of Michigan, Horace H. Rackham School of Graduate Studies; (online Sep. 30, 2015), p. 57-76.

A. Flores et al.; "Multi-kilowatt diffractive coherent combining of pseudorandom-modulated fiber amplifiers"; Optical Engineering, vol. 55, No. 9; 096101; 2016; pp. 1-7.

C. Geddes et al.; "Impact of Monoenergetic Photon Sources on Nonproliferation Applications"; Idaho National Lab (INL); osti. gov; OSTI ID:1376659; No. INL/EXT--17-41137; 2017; pp. 1-151.

C.X. Yu et al.; "Coherent combining of a 4 KW, eight-element fiber amplifier array", Opt. Lett. Vol 36, No. 14; 2011; pp. 2686-2688.

Cameron G.R. Geddes et al.; "Compact quasi-monoenergetic photon sources from laser-plasma accelerators for nuclear detection and characterization"; Nuclear Instruments and Methods in Physics Research B vol. 350, 2015; pp. 116-121.

E. B. Treacy; "Optical pulse compression with diffraction gratings", IEEE J. Quantum Electron. vol. 5, No. 9; 1969; pp. 454-458.

F. V. Hartemann et al.; "Spectral analysis of the nonlinear relativistic Doppler shift in ultrahigh intensity Compton scattering"; Phy. Rev. E vol. 54, No. 3; 1996; pp. 2956-2962.

G. Imeshev et al.; "Ultrashort-pulse second-harmonic generation with longitudinally nonuniform quasi-phase- matching gratings: pulse compression and shaping," J. Opt. Soc. Am. B, vol. 17, No. 2; 2000; pp. 304-318.

H. Pei et al.; "Multi-mJ Ultrashort Pulse Coherent Pulse Stacking Amplification in a Yb-doped 85um CCC Fiber Based System," Conference on Lasers and Electro-Optics, IEEE; 2017; pp. 1-2.

International Preliminary Report on Patentability from International Patent Application No. PCT/US2020/054401, dated Apr. 12, 2022, 8 pages.

M. Kienel et al.; "12 mJ KW-class ultrafast fiber laser system using multidimensional coherent pulse addition", Optics Letters vol. 41, No. 14; 2016; pp. 3343-3346.

M.A. Vorontsov and V. P. Sivokon, "Stochastic parallel-gradient-descent technique for high-resolution wave-front phase-distortion correction", J. Opt. Soc. Am. A; vol. 15, No. 10; 1998; pp. 2745-2758.

O. E. Martínez et al., "Negative group-velocity dispersion using refraction", Journal of the Optical Society of America A; vol. 1, No. 10; 1984; pp. 1003-1006.

S G Rykovanov et al.; "Quasi-monoenergetic femtosecond photon sources from Thomson Scattering using laser plasma accelerators and plasma channels", Journal of Physics B: Atomic, Molecular and Optical Physics; vol. 47; 2014; 234013; pp. 1-22.

(56)    References Cited

OTHER PUBLICATIONS

T. Zhou et al.; "Coherent combination of ultrashort pulse beams using two diffractive optics"; Optics Letters vol. 42, No. 21; 2017; pp. 4422-4425.

T.M. Shay; "Theory of electronically phased coherent beam combination without a reference beam", Optics Express vol. 14, No. 25; 2006; pp. 12188-12195.

Tong Zhou et al.; "Coherent pulse stacking amplification using low-finesse Gires-Tournois interferometers," Opt. Express vol. 23, 2015; pp. 7442-7462.

U.S. Department of Energy; "Workshop on Laser Technology for Accelerators"; Jan. 2013; pp. 1-47.

U.S. Department of Energy; DOE Advanced Accelerator Concepts Research Roadmap Workshop; Feb. 2016, pp. 1-23.

Wei-zung Chang et al.; "Femtosecond pulse spectral synthesis in coherently-spectrally combined multi-channel fiber chirped pulse amplifiers"; Opt. Express vol. 21, No. 3; 2013; pp. 3897-3910.

* cited by examiner

Ideally:
Square pulse Π($t$)

$\Delta T_F \sim 0$ $\Delta T_p$ = 1ps — 10ps $\Delta T_F \sim 0$ $t$

Its spectrum is
sinc($\pi \Delta T_p(v-v_0)$) :

$\Delta v = 2/\Delta T_p$
($\Delta \lambda \sim 3-0.3$nm)

$\Delta T_F \sim 0$ means that the
spectrum extent is infinite!

$v$

SPECTRALLY AND COHERENTLY COMBINED LASER ARRAY

CROSS-REFERENCE TO RELATED APPLICATION

This U.S. National Phase application is based on International Application No. PCT/US2020/054401, filed Oct. 6, 2020, which claims the benefit of U.S. provisional application entitled "Spectrally and Coherently Combined Fiber Laser Array," filed Oct. 6, 2019, and assigned Ser. No. 62/911,319, the entire disclosures of which are hereby expressly incorporated by reference. Priority benefit of these earlier filed applications is hereby claimed.

STATEMENT REGARDING FEDERALLY SPONSORED RESEARCH OR DEVELOPMENT

This invention was made with government support under Contract No. 2016-DN-077-ARI105 awarded by the Department of Homeland Security, and Contract No. DE-AC02-05CH11231 awarded by the U.S. Department of Energy. The government has certain rights in the invention

BACKGROUND OF THE DISCLOSURE

Field of the Disclosure

The disclosure relates generally to lasers.

Brief Description of Related Technology

Radiography, Z-determination and active interrogation using quasi-mono-energetic narrow divergence photon sources have the potential to provide improved sensitivity at a greatly reduced dose, but application simulations indicate that such sources must operate at or above kHz pulse rates to meet application needs. The selectable energy, energy spread, divergence and flux from such sources could allow delivery of only the photons needed, thus addressing the critical issue with current broad-band photon sources, where unnecessary doses can interfere with the signatures to be detected and restrict operation environment. This could deliver improved results for applications including cargo screening, single-sided detection of concealed material, treaty verification, safeguards, and emergency response.

Thomson scattering of a laser beam from an electron beam (also known as inverse Compton scattering, or ICS) provides such tunable-energy photons, but conventional accelerators to reach the required MeV-range photon energies must be long (e.g., greater than 10 meters), thereby impeding practical use. Laser driven plasma accelerators (LPAs) can provide photon energies in the MeV-range using compact centimeter-scale accelerating structures, but currently rely on laser systems which do not operate at the multi-kHz repetition rates that are necessary for applications. These lasers are also relatively large and are composed of many optical components whose alignment and maintenance are often complicated.

Furthermore, achieving a near-monochromatic scattered photon spectrum puts very stringent constraints on a scattering laser pulse format, which should be bandwidth-limited with few-picoseconds in duration, but with precisely tailored flat-top shape and very short rise and fall times. These pulse requirements are not possible to achieve at scalable pulse energies and powers using existing high energy ultrashort pulse laser technologies based on chirped pulse amplification.

SUMMARY OF THE DISCLOSURE

In accordance with one aspect of the disclosure, a signal source configured to generate input pulses, a diffraction grating module configured to stretch and split the input pulses into a plurality of spectral channels, a set of phase control devices, each phase control device being configured for spectral phase control of a respective spectral channel of the plurality of spectral channels, a power amplifier array of amplifier modules, each amplifier module of the power amplifier array being configured to amplify a respective spectral channel of the plurality of spectral channels, a spectral combiner configured to spectrally combine the plurality of spectral channels via diffraction grating-based pulse compression, and a feedback controller coupled to the spectral combiner to provide feedback to the set of phase control devices for pulse shaping.

In connection with any one of the aspects described herein, the systems described herein may alternatively or additionally include or involve any combination of one or more of the following aspects or features. The power amplifier array includes an array of fiber amplifiers. The signal source includes a mode-locked repetition rate oscillator. The laser system further includes a pair of electro-optic modulators configured to encode a stacking profile, the pair of electro-optic modulators being disposed between the signal source and the diffraction grating module. The laser system further includes a pulse stacker to generate output pulses via temporal combination of a pulse train provided by the spectral combiner. The signal source includes an oscillator and a repetition rate multiplier coupled to the oscillator. The repetition rate multiplier is based on a Fabry-Perot cavity. The laser system further includes a phase stabilization controller to control the repetition rate multiplier in accordance with the temporal combination of the pulse stacker. Delays experienced in each spectral channel of the plurality of spectral channels are equal. The laser system further includes a set of delay modules to introduce a respective delay in each spectral channel of the plurality of spectral channels. Each delay module of the set of delay modules modifies a path length of each spectral channel of the plurality of spectral channels. The power amplifier array is disposed to amplify each spectral channel of the plurality of spectral channels after the spectral control is provided by the set of phase control devices. The laser system further includes a splitting array to generate a sub-array of channels for a central band of the plurality of spectral channels, and a beam combiner coupled to the power amplifier array to spatially combine the amplified sub-array of channels. The splitting array includes an array of amplifier modules. The array of amplifier modules are monolithically integrated. Each spectral channel of the plurality of spectral channels presents a corresponding component of a sinc function of the output pulses. The components of the sinc function are configured such that the output pulses are flattop pulses. The plurality of spectral channels further include 16 side-band channels. The spectral combiner includes a grating having a Treacy configuration. The diffraction grating module includes a grating having a Martinez configuration. The spectral combiner is implemented in free-space optics. A photon generation system includes an electron generator configured to generate a beam of electrons, and a laser driver including a laser system as described herein. The laser driver is configured to direct pulses toward the electron beam such that photons are generated via incidence of the pulses upon the electron beam. The photons are generated via Thomson scattering. The laser driver is configured such that a gamma ray is generated via the Thomson scattering.

BRIEF DESCRIPTION OF THE DRAWING FIGURES

For a more complete understanding of the disclosure, reference should be made to the following detailed description and accompanying drawing figures, in which like reference numerals identify like elements in the figures.

Figures 7A, 7B:
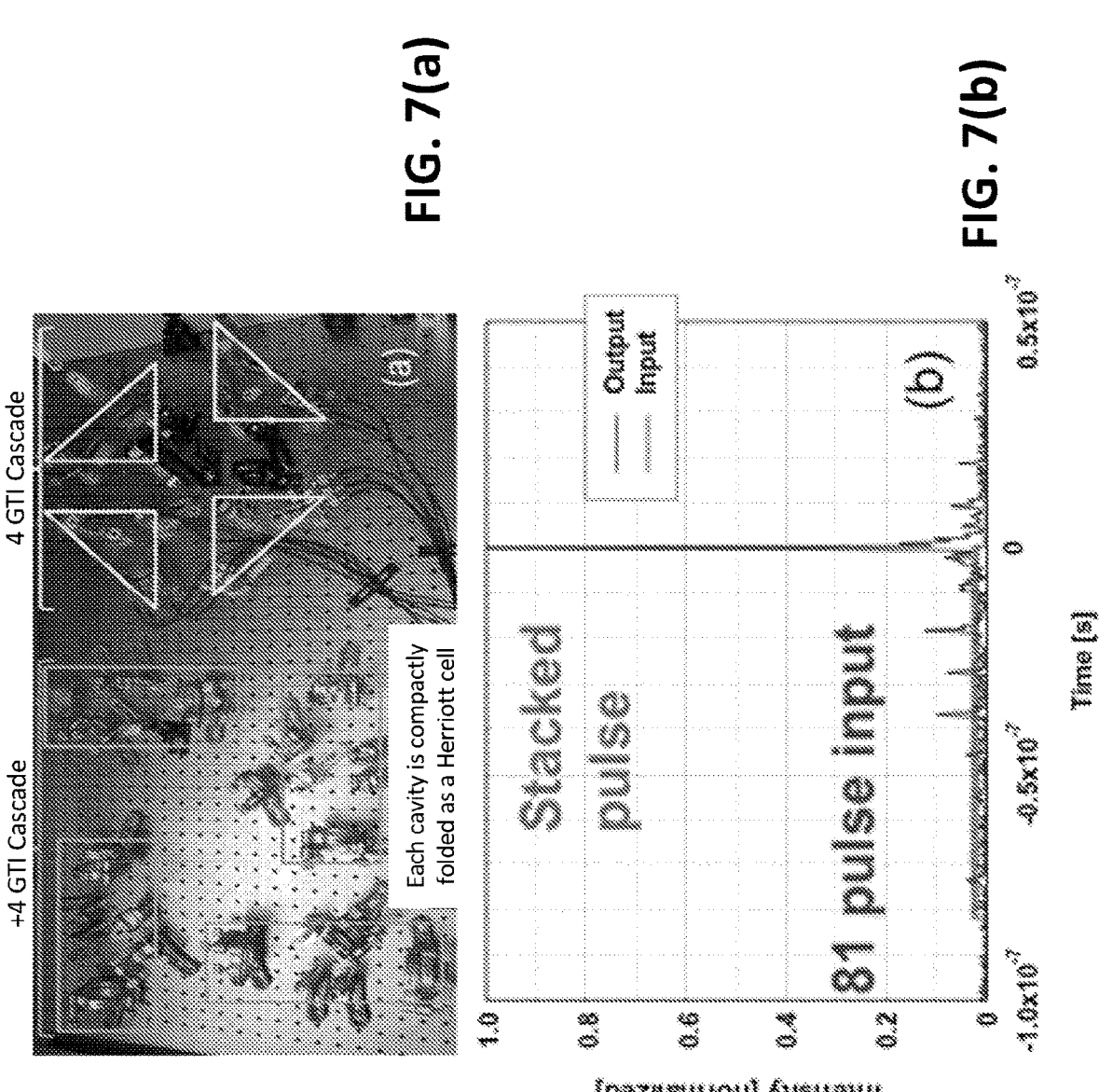

FIGS. 7(a) and 7(b) depict a photographic view and a graphical view of an example of a coherent pulse stacking (CPS) arrangement for coherent pulse stacking amplification (CPSA) in connection with a laser system in accordance with one example.

Figure 8:
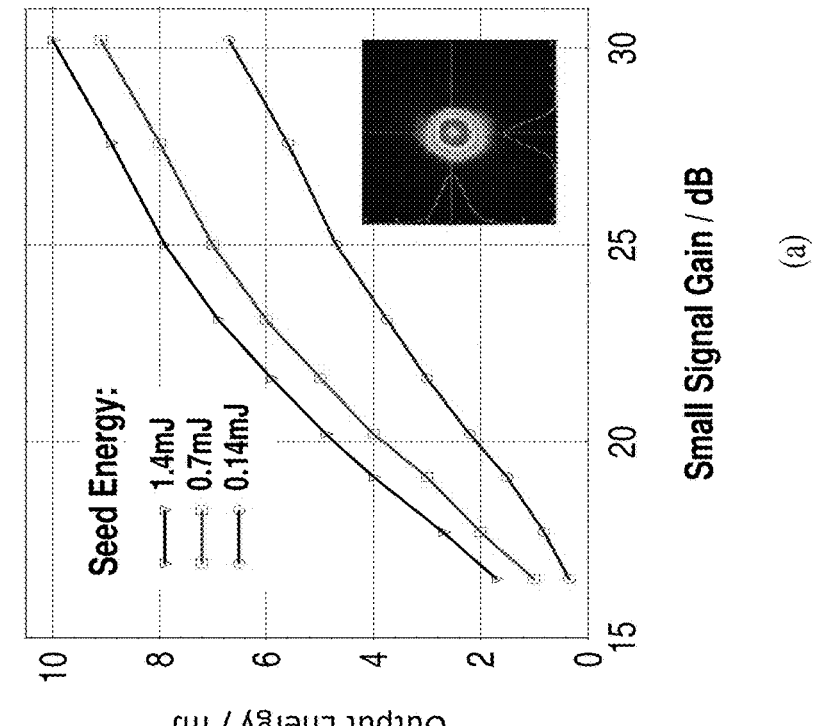

FIG. 8 depicts two graphical plots of output results of a laser system configured in accordance with one example, the first plot presenting measured output energy versus small signal gain in a 85 μm core chirally-coupled-core (CCC) fiber, with various seed energies, and the second plot presenting a measured autocorrelation trace of multi-mJ compressed pulses at various energies and the calculated corresponding nonlinear phases, with spectrum at 10 mJ in an inset plot.

Figure 9:
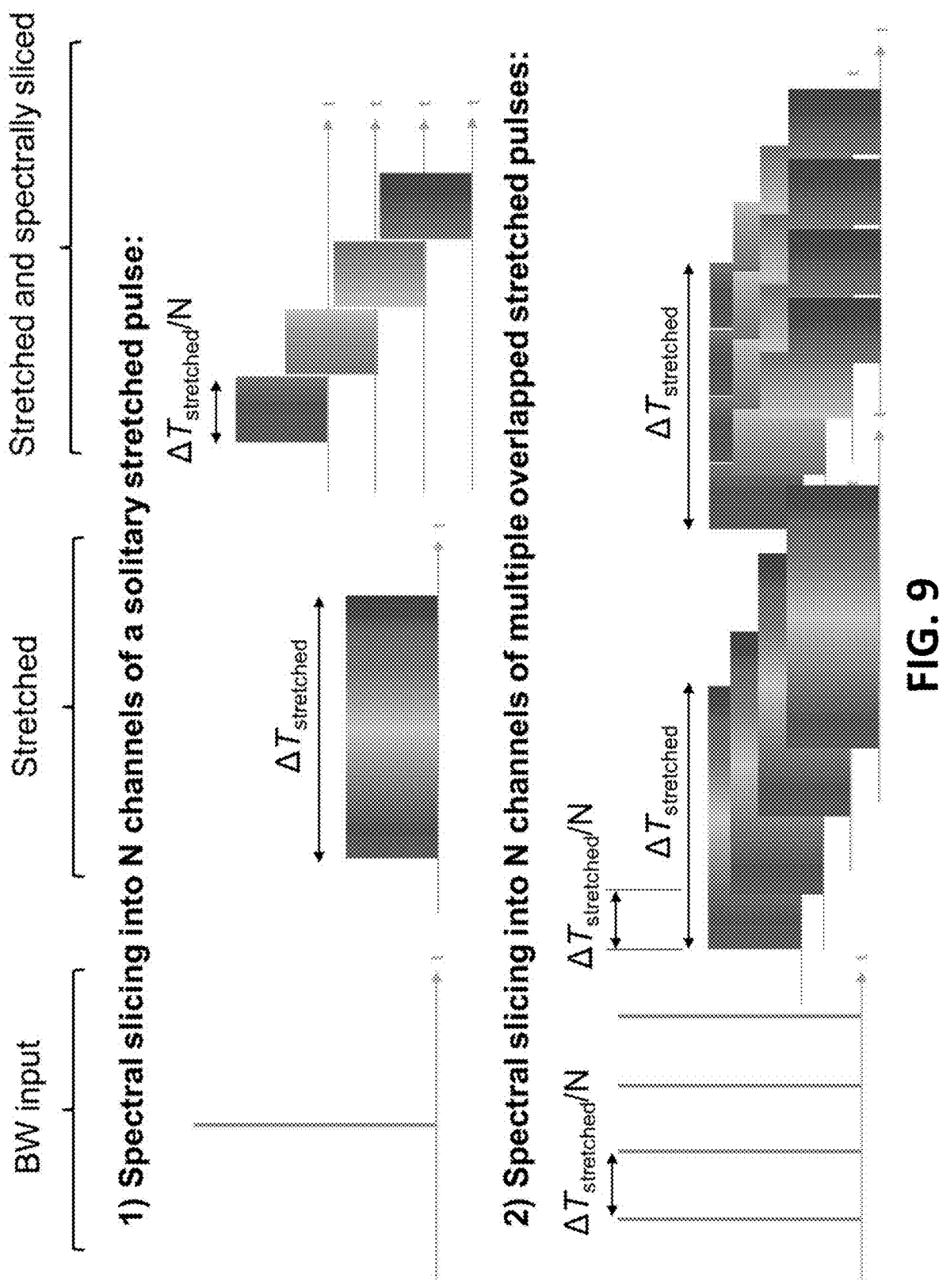

FIG. 9 is a graphical view of addressing a trade-off between chirped pulse amplification (CPA) and coherent spectral combining (CSC) implementations through pulse stacking in accordance with one example.

Figure 10:
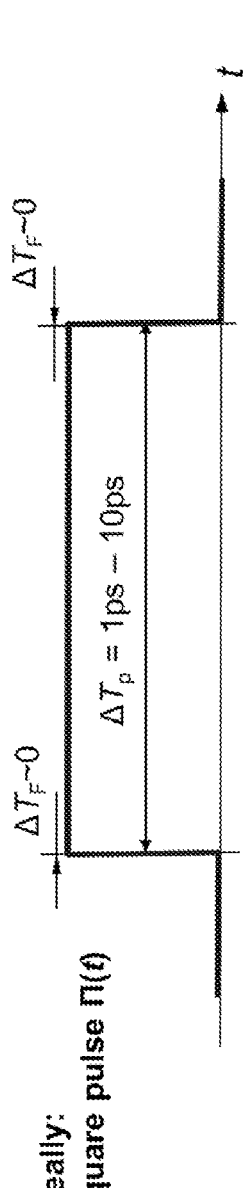
Figure 10:
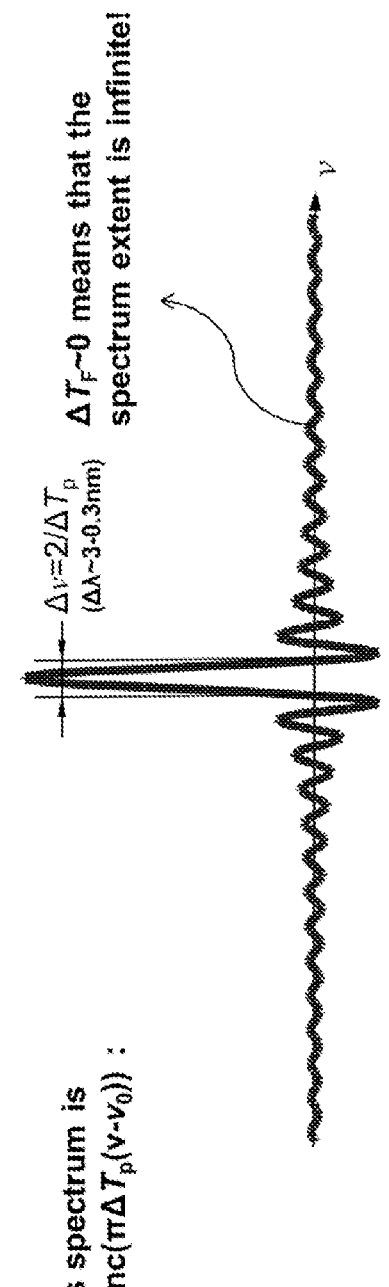
Figure 10:

FIG. 10 depicts a graphical plot of an ideal scattering driving pulse, which is a bandwidth-limited square pulse with infinitely abrupt rise and fall times, as well as a graphical plot of the corresponding Fourier transform of the square pulse, i.e., a sinc function.

Figure 11:
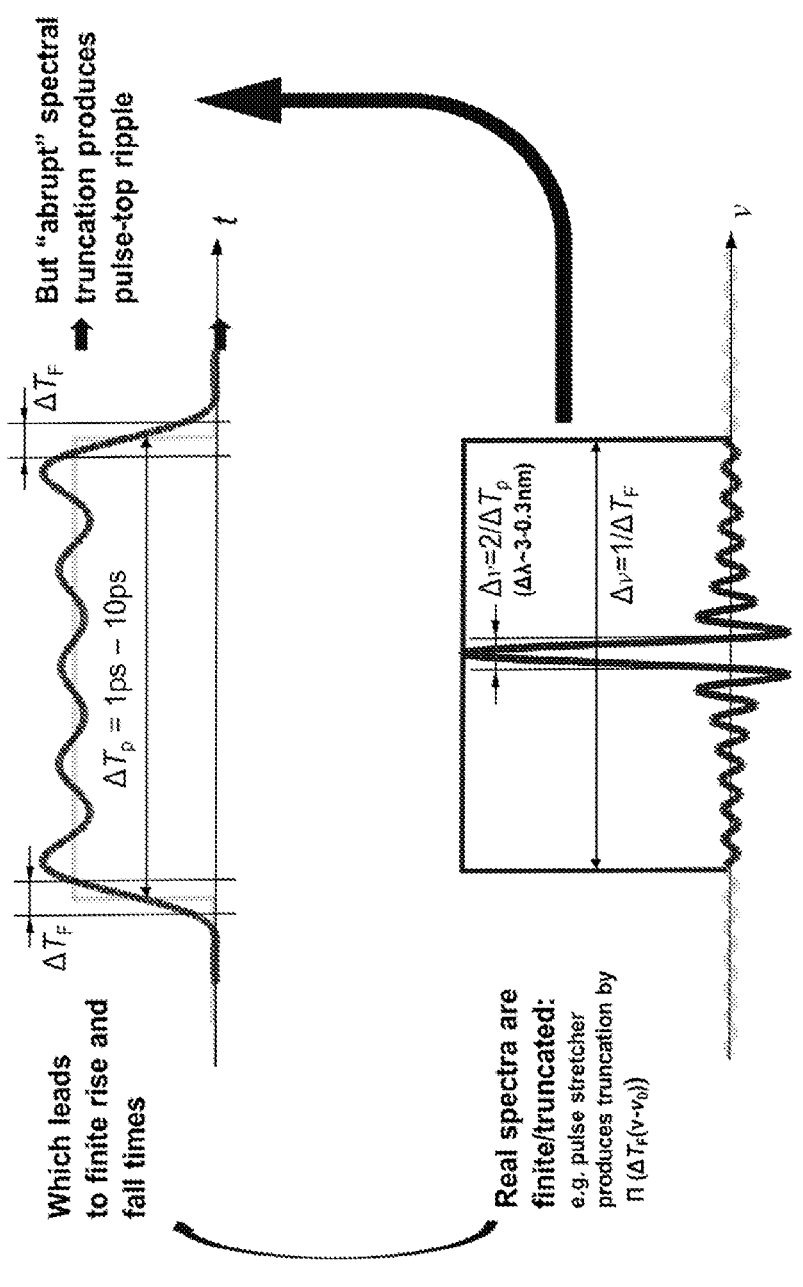

FIG. 11 depicts graphical plots of an example pulse after truncation of the spectrum, the example pulse being a flattop pulses with finite rise and fall times, and also a significant amount of pulse-top intensity ripple.

Figure 12:
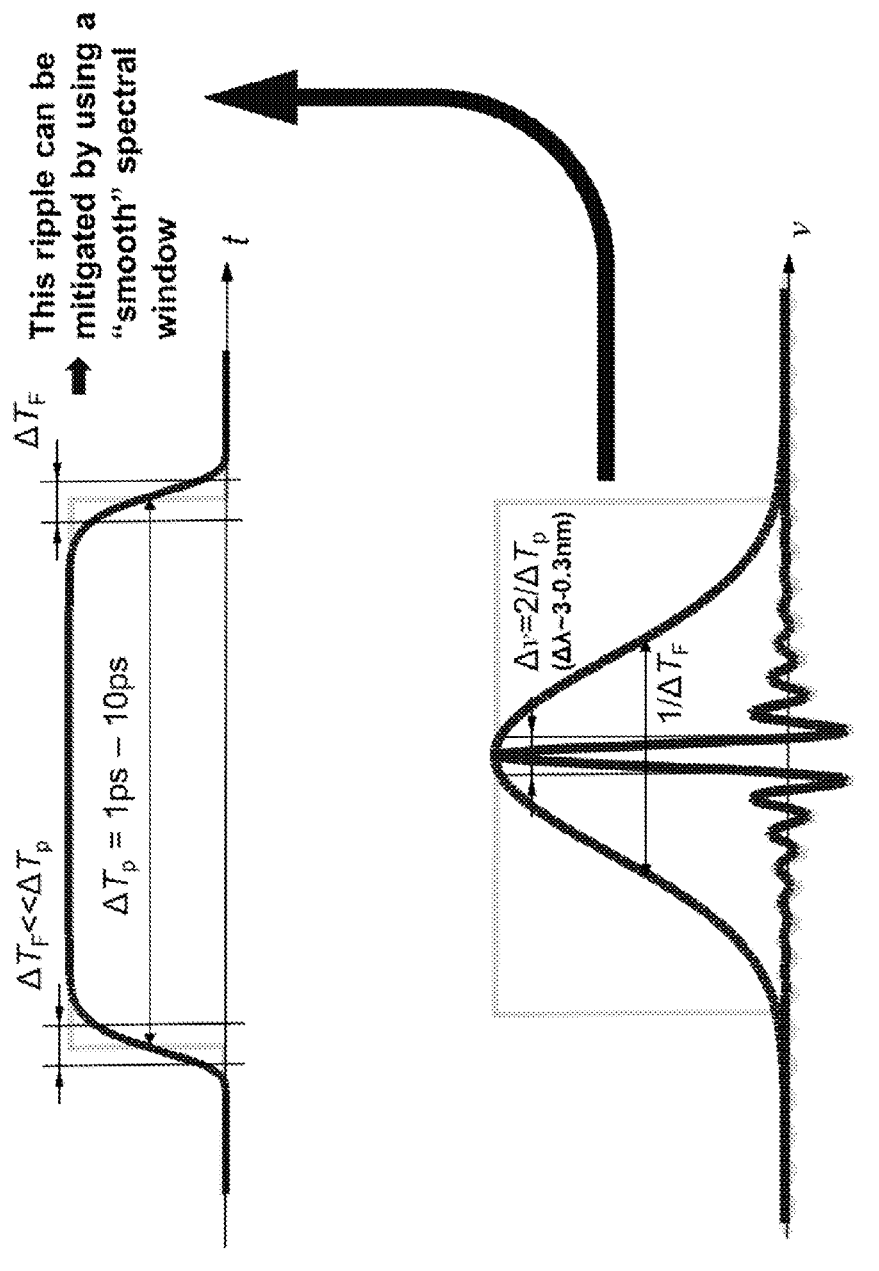

FIG. 12 depicts graphical plots of an example pulse having a pulse-top intensity ripple mitigated via use of a smooth spectral window.

Figure 13:
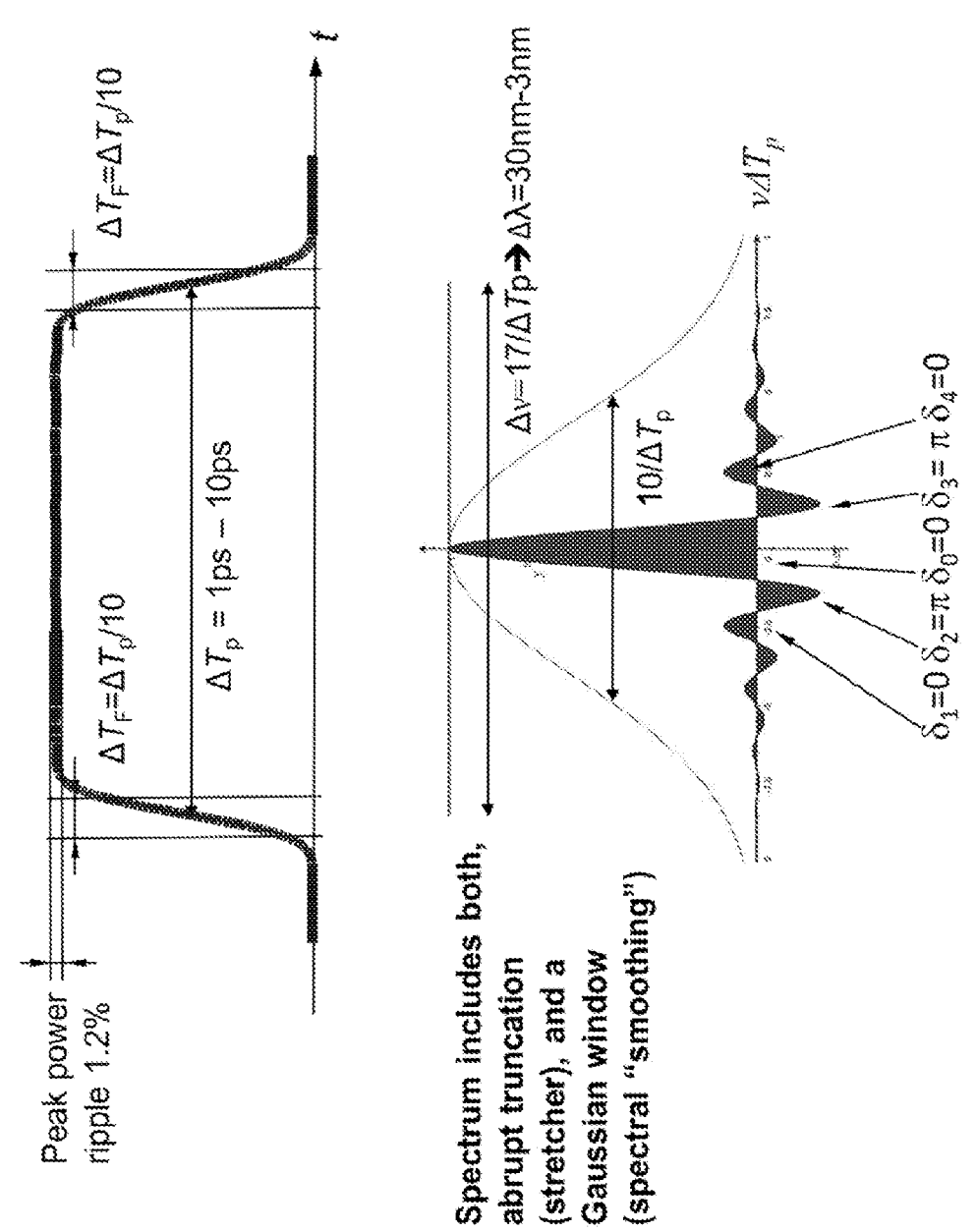

FIG. 13 depicts graphical views of an example of a spectral signal design for synthesizing optimized flattop pulses for efficient generation of quasi-monoenergetic Thomson-scattered gamma photons. The graphical views include curves indicative of an optimized generation of the flat top pulse consistent with example laser amplifier systems.

Figure 14:
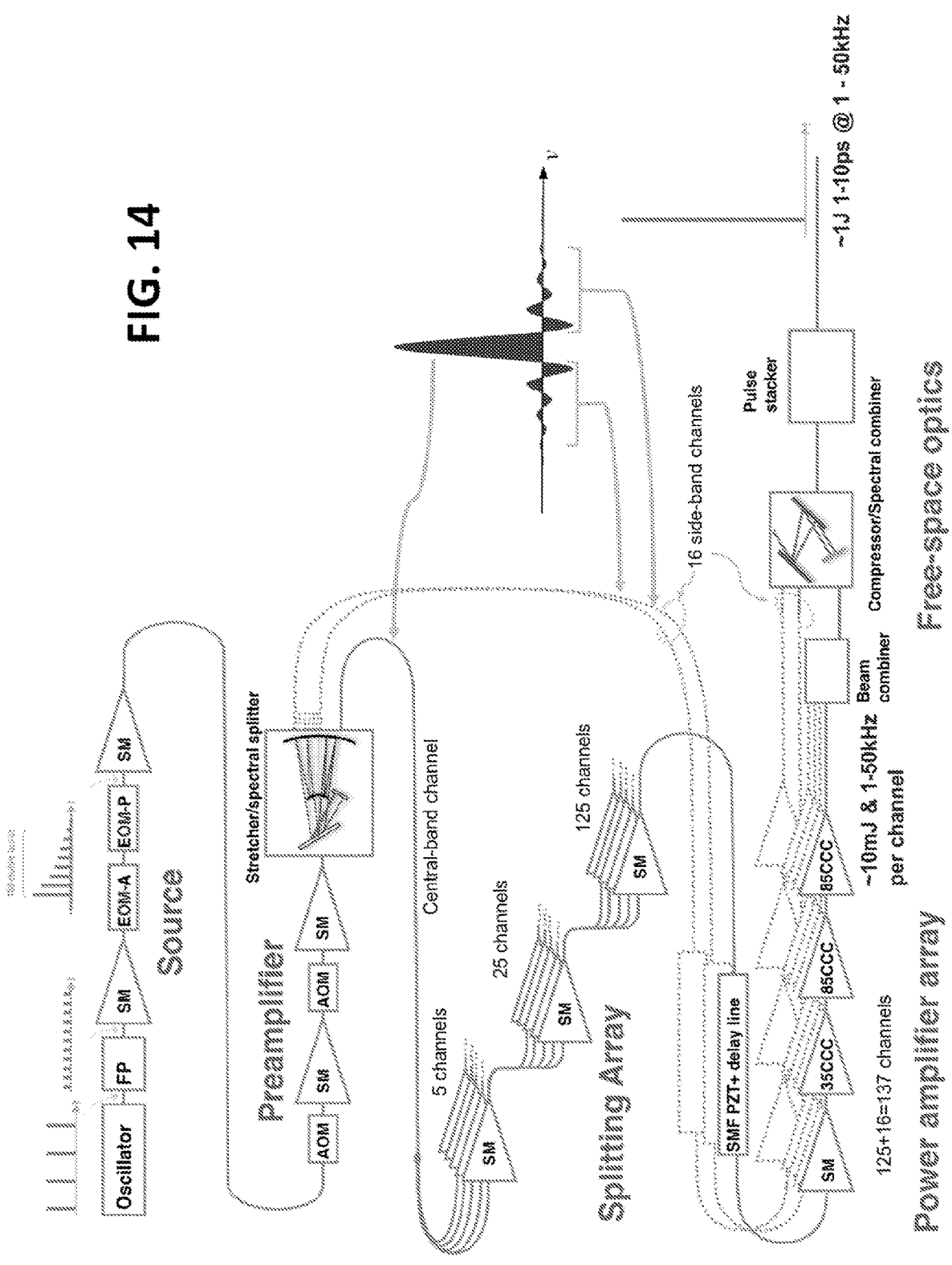

FIG. 14 is a schematic view of a fiber laser array architecture in accordance with a 17-channel example. The fiber laser array has a spatially, spectrally, and time-domain coherently combined architecture for generating, for example, about 1 J flattop-synthesized optical pulses at 1-50 kHz repetition rates. In this example, spatial combining is only used for achieving high energies in a central-band spectral channel. The other 16 side-band spectral channels may be generated in single-channel amplifiers. Coherent pulse stacking amplification is used to reduce the total array size to about 100 channels, and to enable practically compact pulse stretchers and compressors.

Figure 15:
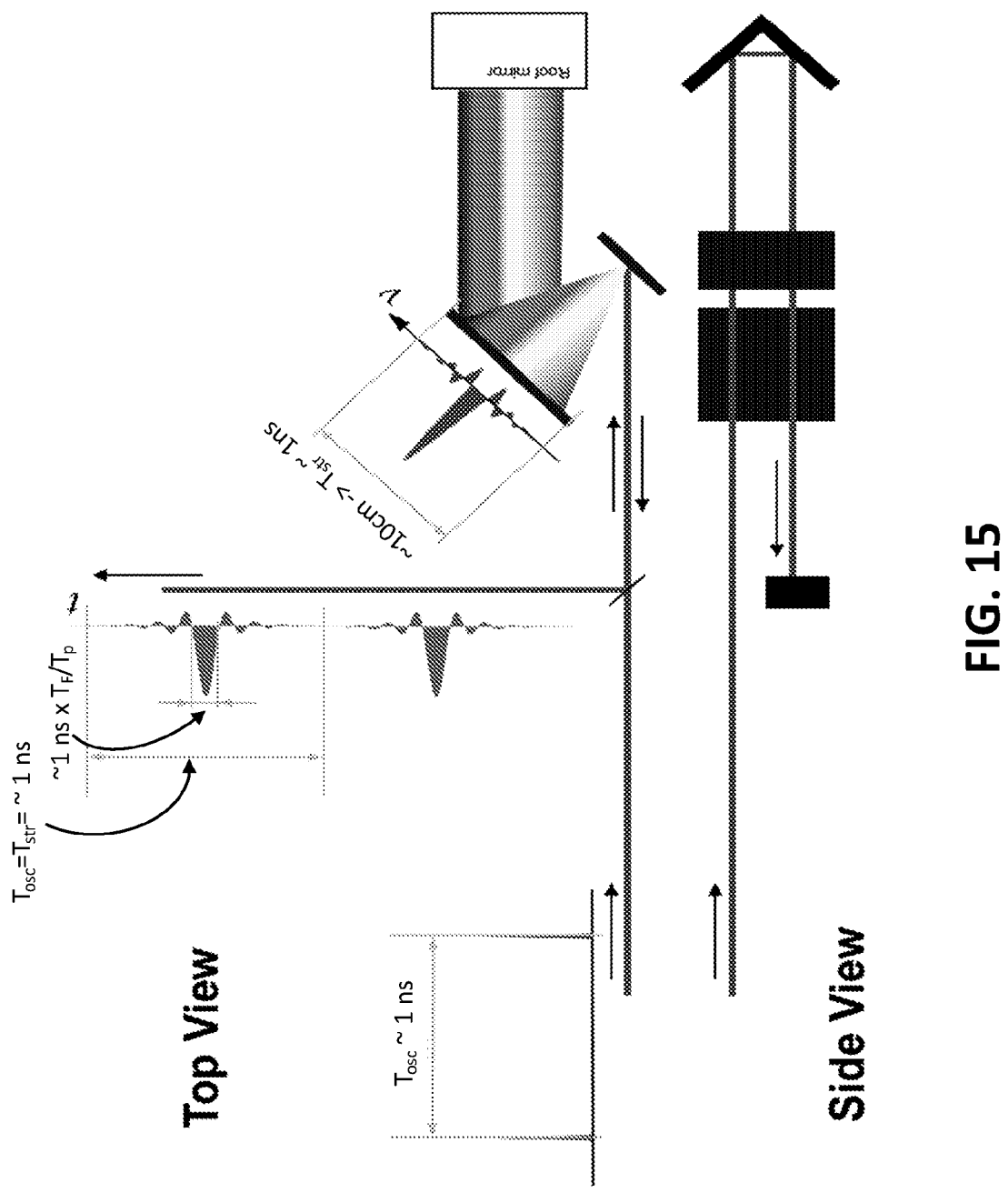

FIG. 15 schematically depicts top and side views of a trade-off between coherent spectral synthesis of flattop pulses and a conventional CPA in accordance with one example. In this example, incident pulses are separated by about 1 ns period, corresponding to the 1 GHz repetition rate. Strongly-stretched pulses have the same temporal shape as their spectrum.

Figure 16:
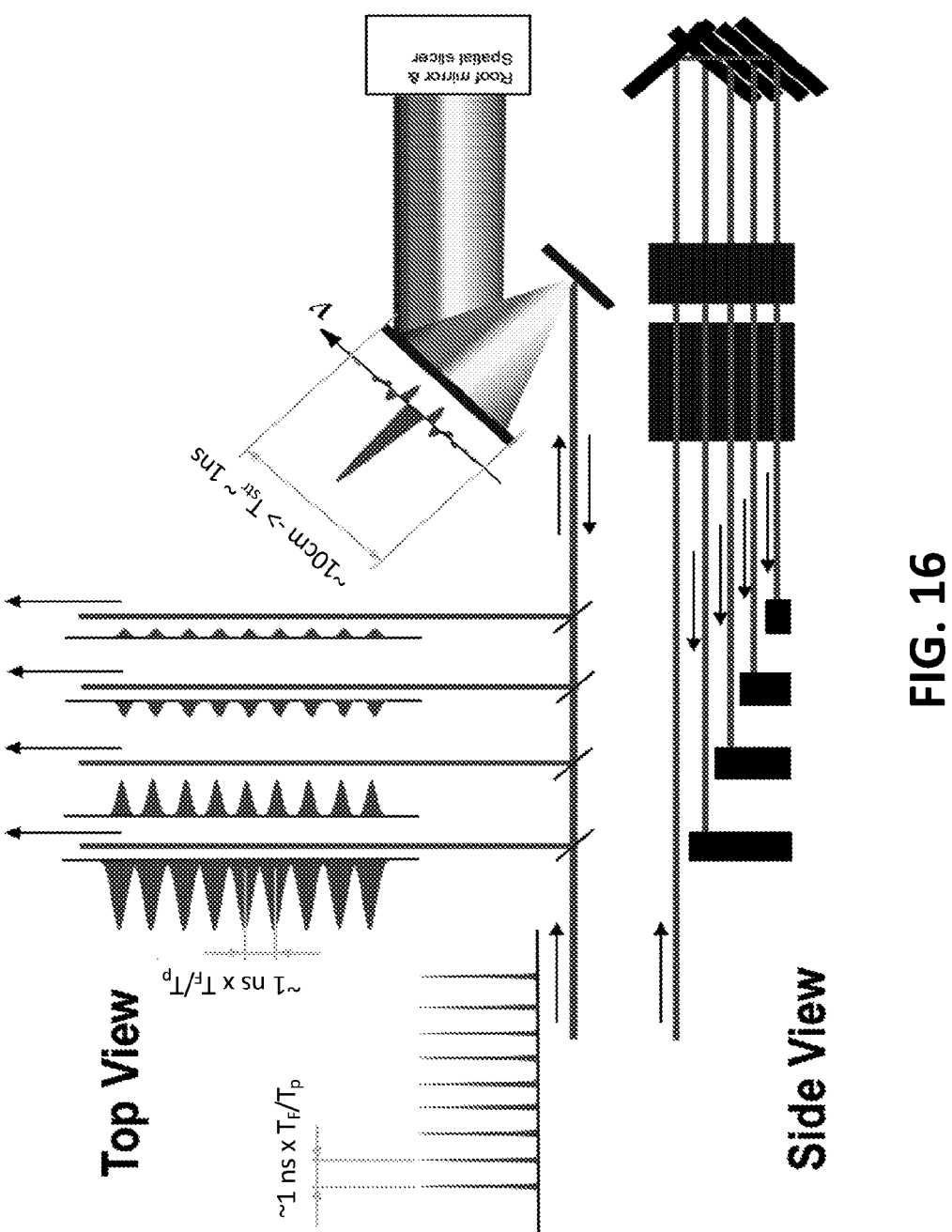

FIG. 16 schematically depicts top and side views of an arrangement in which simultaneous pulse stretching/spectral splitting and pulse compression/spectral combining are implemented in accordance with one example.

Figure 17:
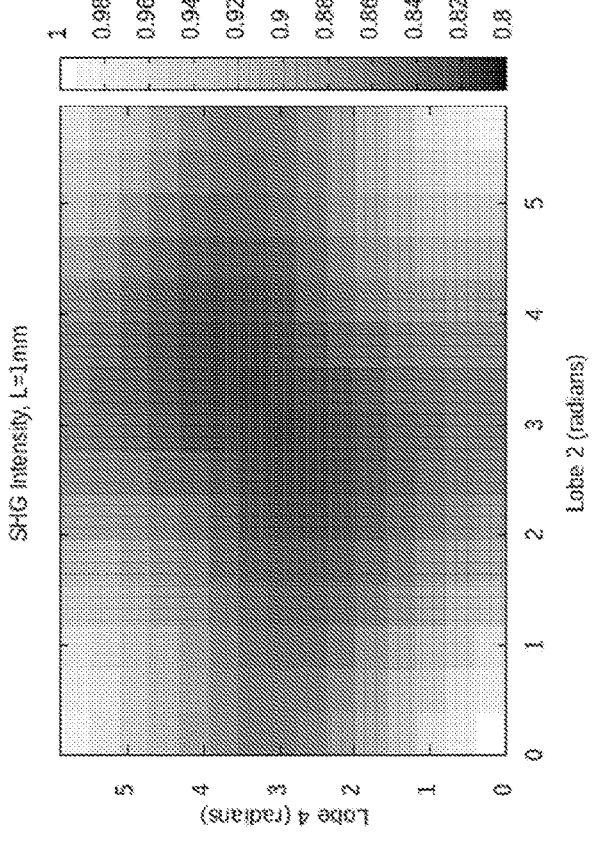
Figure 17:
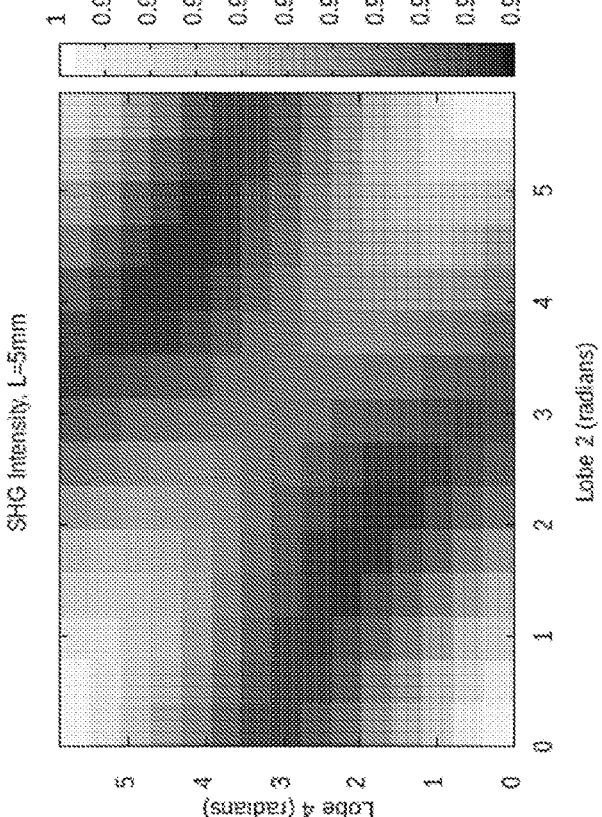

FIG. 17 depicts graphical plots of numerically simulated Second Harmonic Generation (SHG) responses for an input corresponding to a five-channel sinc-spectrum signal. Vertical and horizontal axes correspond to $\delta_2$ and $\delta_3$ respectively, and the other two phases are set to $\delta_1=0$, $\delta_4=0$. The desired point of operation is in the center of the graph, when $\delta_2=\delta_3=0$. In the left response plot, a crystal length of 5-mm is considered. In the right response plot, a crystal length of 1-mm is considered.

Figure 18:
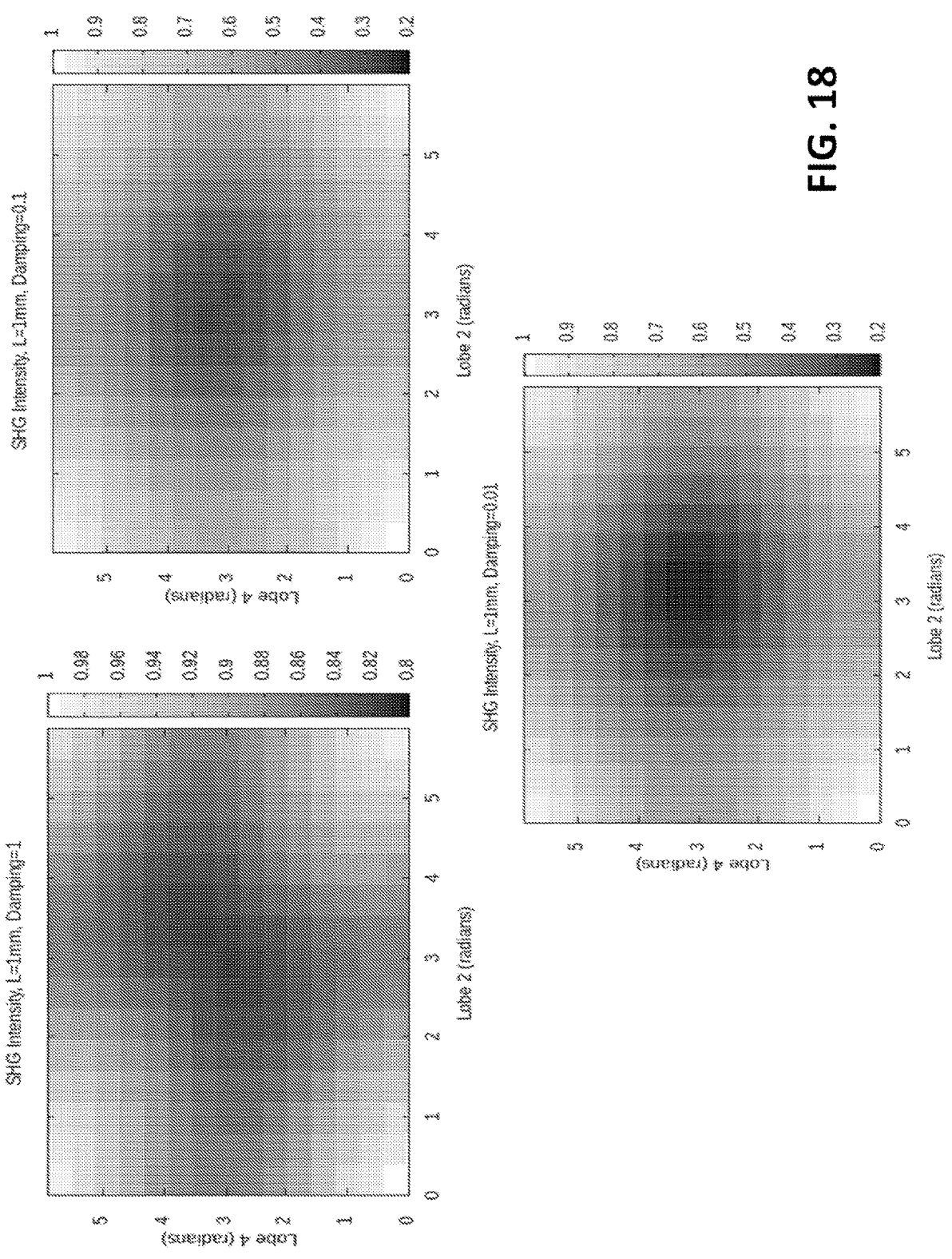

FIG. 18 depicts graphical plots of numerically simulated SHG responses for an input corresponding to a five-channel sinc-spectrum signal. Vertical and horizontal axes correspond to $\delta_2$ and $\delta_3$ respectively, and the other two phases are set to $\delta_1=0$, $\delta_4=0$. The desired point of operation is in the center of the graph, when $\delta_2=\delta_3=0$. The crystal length is set to 1-mm, and a damping factors 1, 0.1, and 0.01 are used for the central lobe, as shown.

Figure 19:
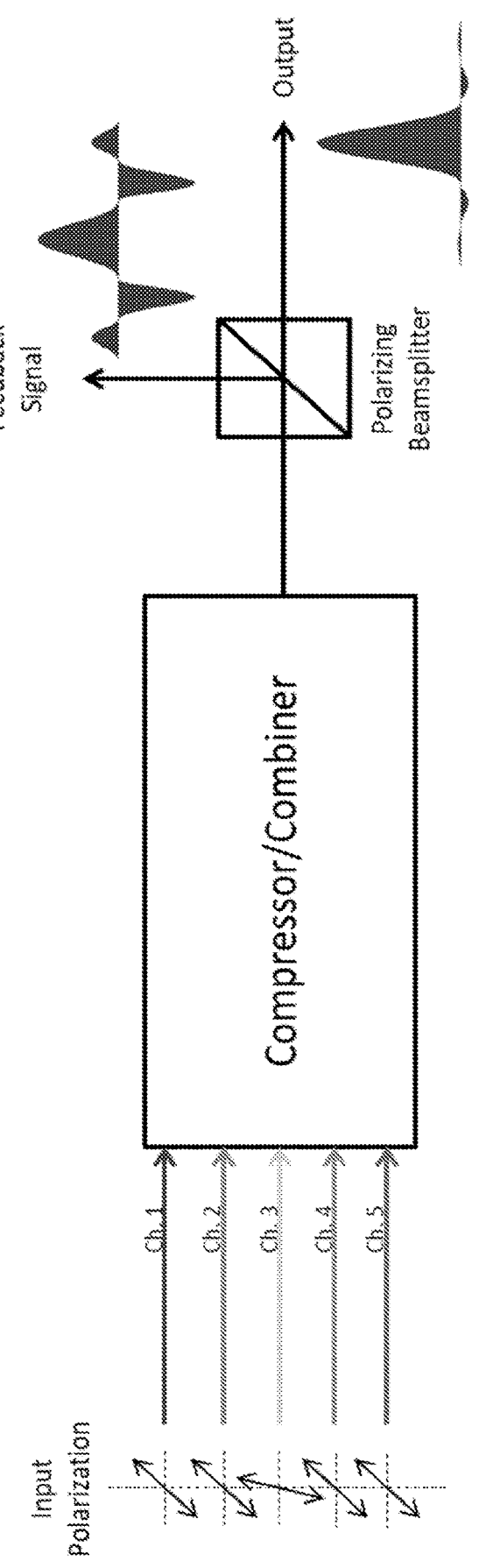

FIG. 19 is a schematic diagram of a feedback signal generation technique using polarization in accordance with one example in which input polarization of each channel to the compressor/combiner is controlled, and a polarizing beamsplitter is used to separate the feedback signal from the main output.

Figure 20:
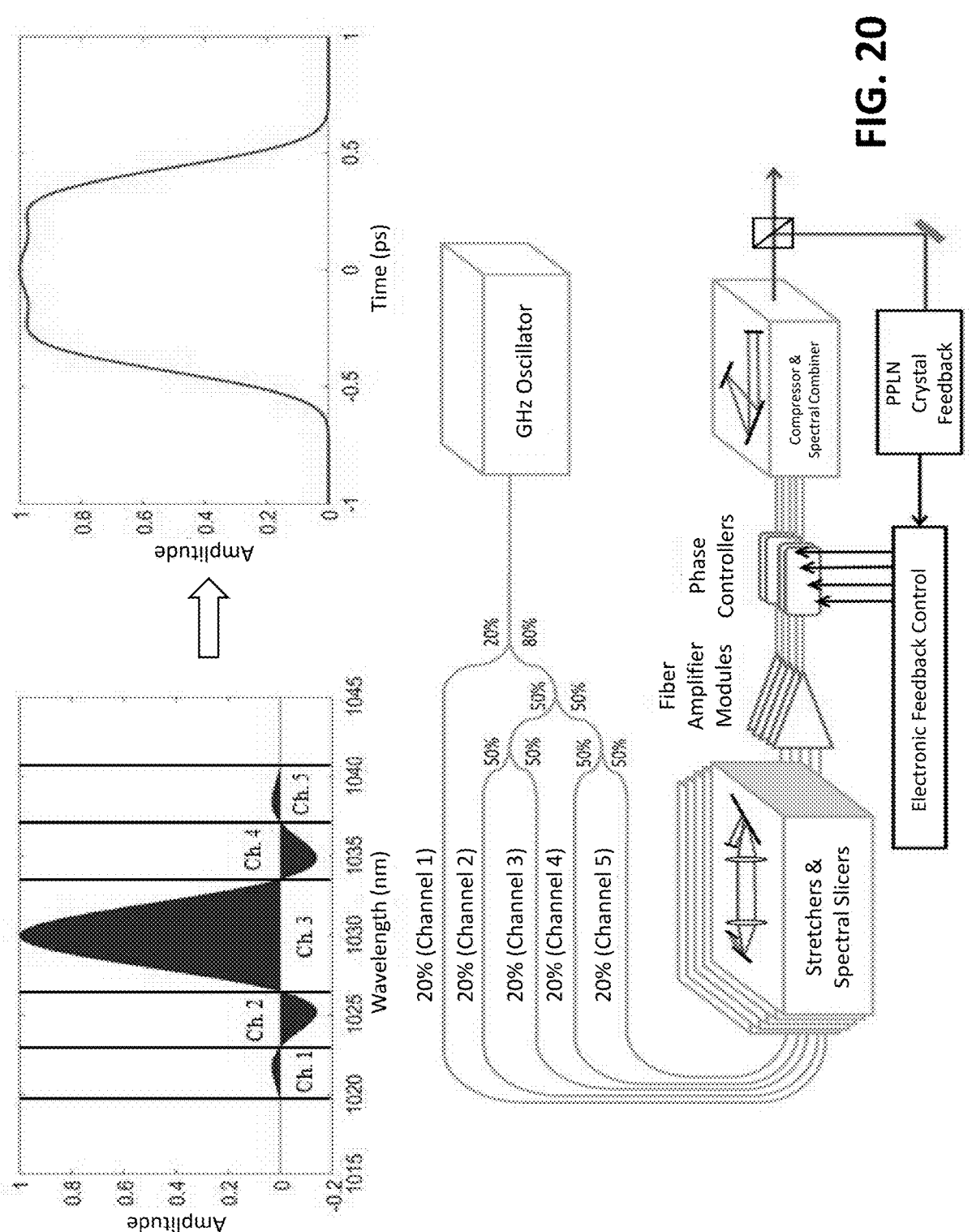

FIG. 20 depicts a five-channel spectral combining/synthesis system in accordance with one example for validating aspects of the disclosed scattering-laser systems described herein.

Figure 21:
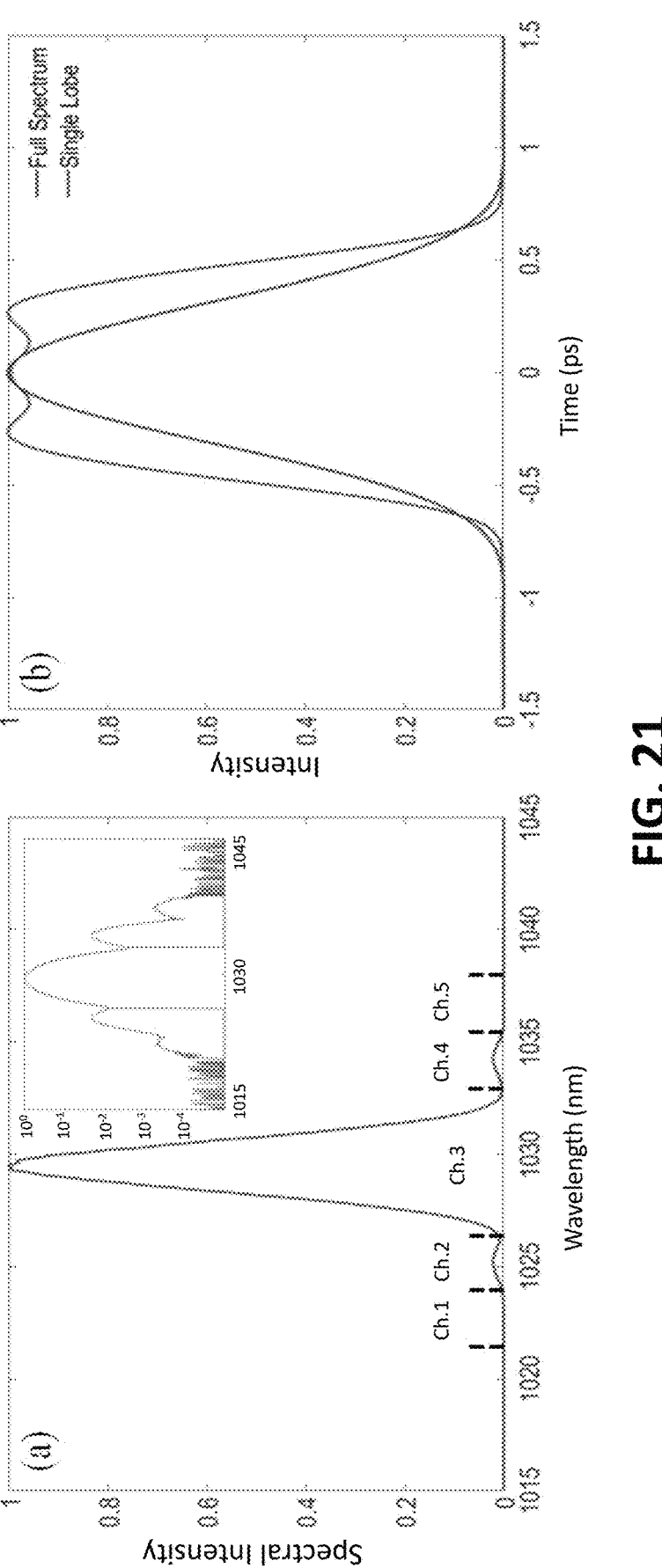

FIG. 21 depicts a stretcher of a channel in accordance with one example, as well as a schematic diagram of a spectral slicer used in the stretcher in accordance with one example.

Figure 22:
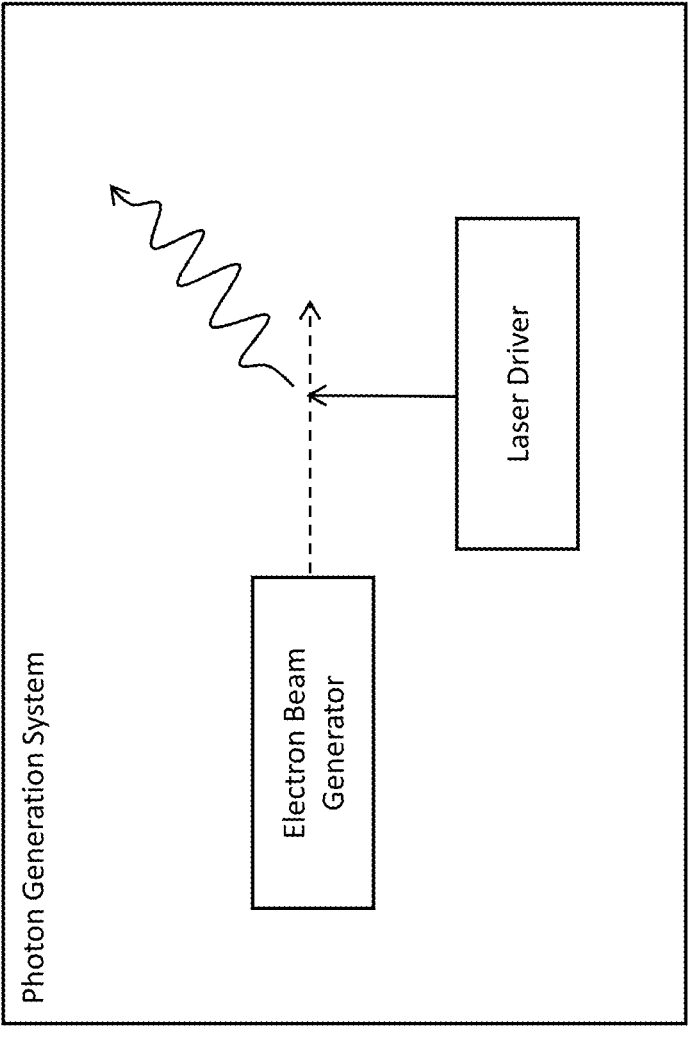
Figure 23:
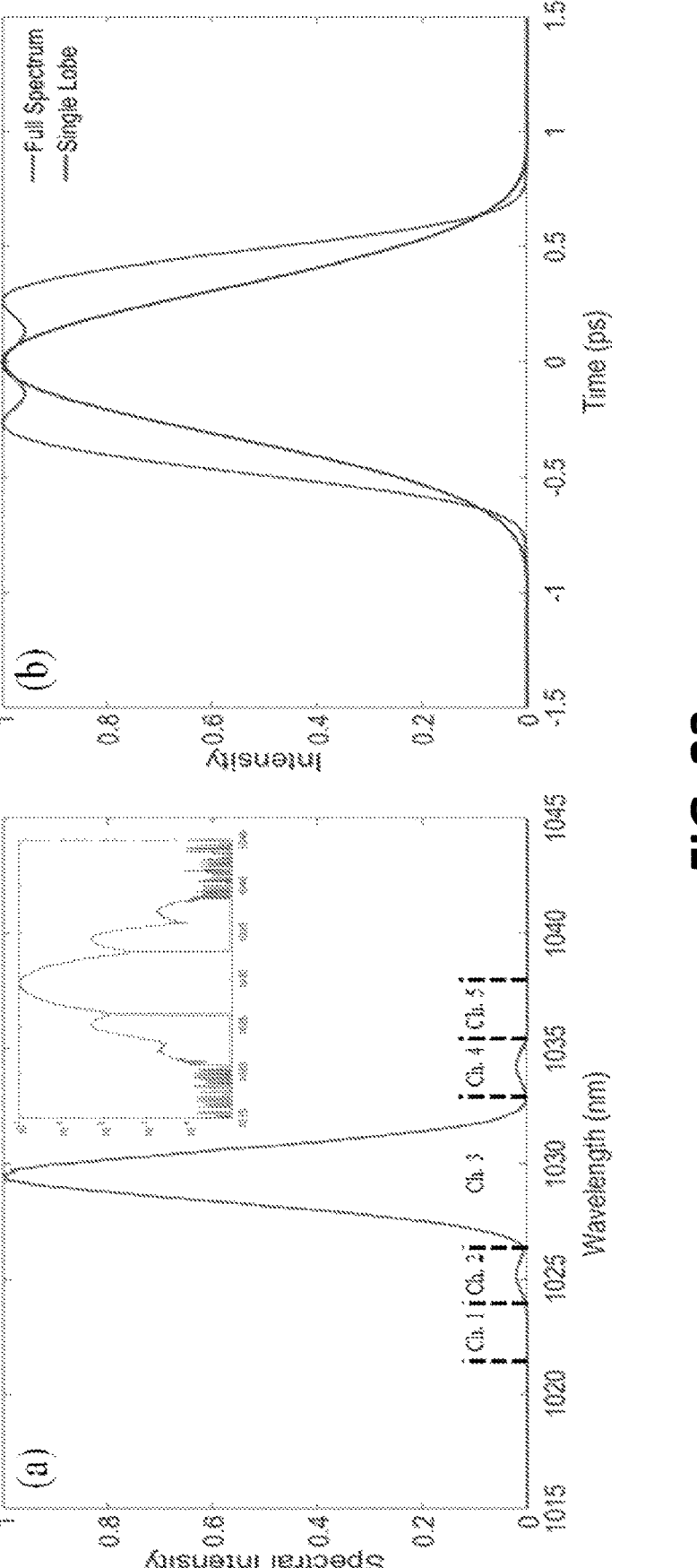
Figure 24:
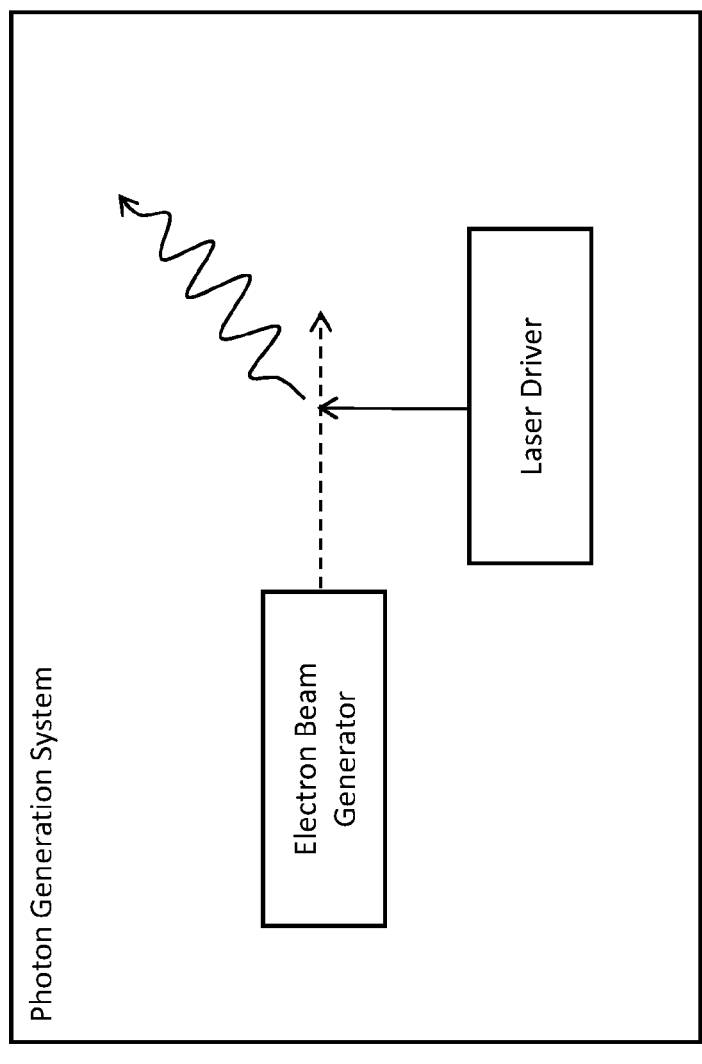

FIG. 22 depicts a compressor in accordance with one example in which five spectral channels enter, emerge at different heights, and are aligned into a continuous chirp, which is then sent back through a grating pair.

FIG. 21 depicts graphical plots of a spectrum of measured combined output from a compressor with an insert on logarithmic scale, as well as a calculated pulse profile from the measured spectrum, assuming correct phase control.

FIG. 22 depicts a schematic diagram of a photon generation system having a laser driver in accordance with one example.

The embodiments of the disclosed laser drivers and photon generation systems may assume various forms. Specific embodiments are illustrated in the drawing and here-after described with the understanding that the disclosure is intended to be illustrative. The disclosure is not intended to limit the invention to the specific embodiments described and illustrated herein.

DETAILED DESCRIPTION OF THE DISCLOSURE

Laser systems having a spectrally-coherently combined laser array are described. The disclosed laser systems may be configured to synthesize power and energy scalable bandwidth-limited flattop picosecond pulses. Such pulses may, in turn, be used to generate quasi-mono-energetic gamma rays via Thomson scattering of these pulses off an accelerated electron beam. Such narrow-bandwidth gamma rays are useful for numerous applications ranging from homeland security to biomedical and fundamental sciences.

The laser array (e.g., fiber laser array) of the disclosed laser systems utilize a number of techniques to address the bandwidth-limited picosecond pulse duration and flattop shaped pulse requirements of Thomson sources in a power and energy scalable configuration, which are not achievable using currently existing laser approaches. The disclosed laser systems address a challenge unmet by existing scattering laser source technologies by introducing a number of new technical solutions to enable power and energy scalable Thomson-scattering laser drivers with the characteristics suitable for generating mono-energetic gamma rays.

There are a number of applications of Thomson scattering photon sources for, e.g., generation of gamma rays, including special nuclear materials detection, narcotics and explosives detection, non-destructive inspection of additive manufactured components, as well as of critical engine and plane-body components for the aerospace industry. Still further applications include new diagnostics and treatments in medicine and tools to better understand the details of various nuclear structures. The disclosed laser systems are thus useful in a wide variety of applications.

One or more aspects of the disclosed laser system involve or otherwise include implementation of coherent pulse stacking amplification (CPSA) techniques. Further details regarding CPSA are set forth in U.S. Pat. No. 9,865,986 ("Coherent combining pulse bursts in time domain") and U.S. Pat. No. 10,312,657 ("Coherent combining pulse bursts in time domain"), the entire disclosures of which are hereby incorporated by reference.

Figure 1:
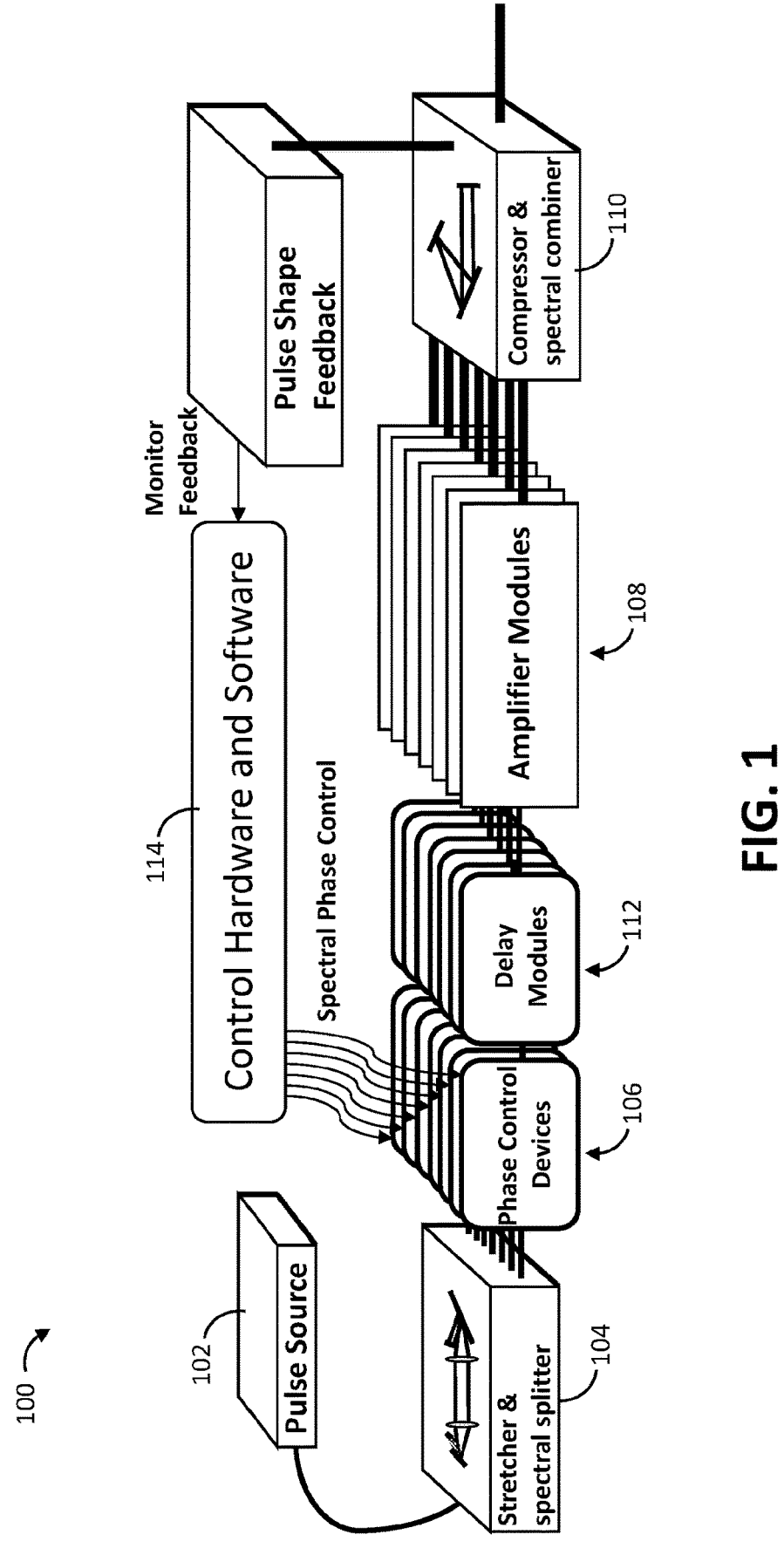
FIG. 1 is a schematic diagram of a laser system with pulse shaping via coherent spectral combination in accordance with one example.

FIG. 1 depicts a laser system 100 configured for pulse shaping via coherent spectral combination in accordance with one example. The laser system 100 includes a signal source 102 configured to generate input pulses, a diffraction grating module 104 configured to stretch and split the input pulses into a plurality of spectral channels, a set 106 of phase control devices, a power amplifier array 108 of amplifier modules, and a spectral combiner 110 configured to spectrally combine the plurality of spectral channels via diffraction grating-based pulse compression.

Each phase control device in the set 106 is configured for spectral phase control of a respective spectral channel of the plurality of spectral channels.

Each amplifier module of the power amplifier array 108 is configured to amplify a respective spectral channel of the plurality of spectral channels. In this example, the power amplifier array is disposed to amplify each spectral channel of the plurality of spectral channels after the spectral control is provided by the set of phase control devices. In other cases, the phase control may be implemented after the amplification. In some cases, the power amplifier array 108 includes an array of fiber amplifiers.

In the example of FIG. 1, the laser system 100 also includes a set 112 of delay modules. Each delay module is configured to introduce a respective delay in a respective spectral channel of the plurality of spectral channels. Using a module to control the delay(s) may be useful for matching timing at the output of the laser system 100. In some cases, each delay module modifies a path length of each spectral channel of the plurality of spectral channels. Alternative or additional techniques for implementing delays may be used in other cases.

The laser system 100 further includes a feedback controller 114 configured to control the set 106 of phase control devices for pulse shaping. In the example of FIG. 1, the feedback controller 114 includes control hardware (e.g., one or more processors) implementing software (e.g., one or more instruction sets stored on one or memories). In some cases, the feedback controller 114 is or includes a field programmable gate array (FPGA), but other processors and memories may be used. The feedback controller 114 may be responsive to pulse shape feedback detected, captured, or otherwise obtained at the combiner 110.

Figure 2:
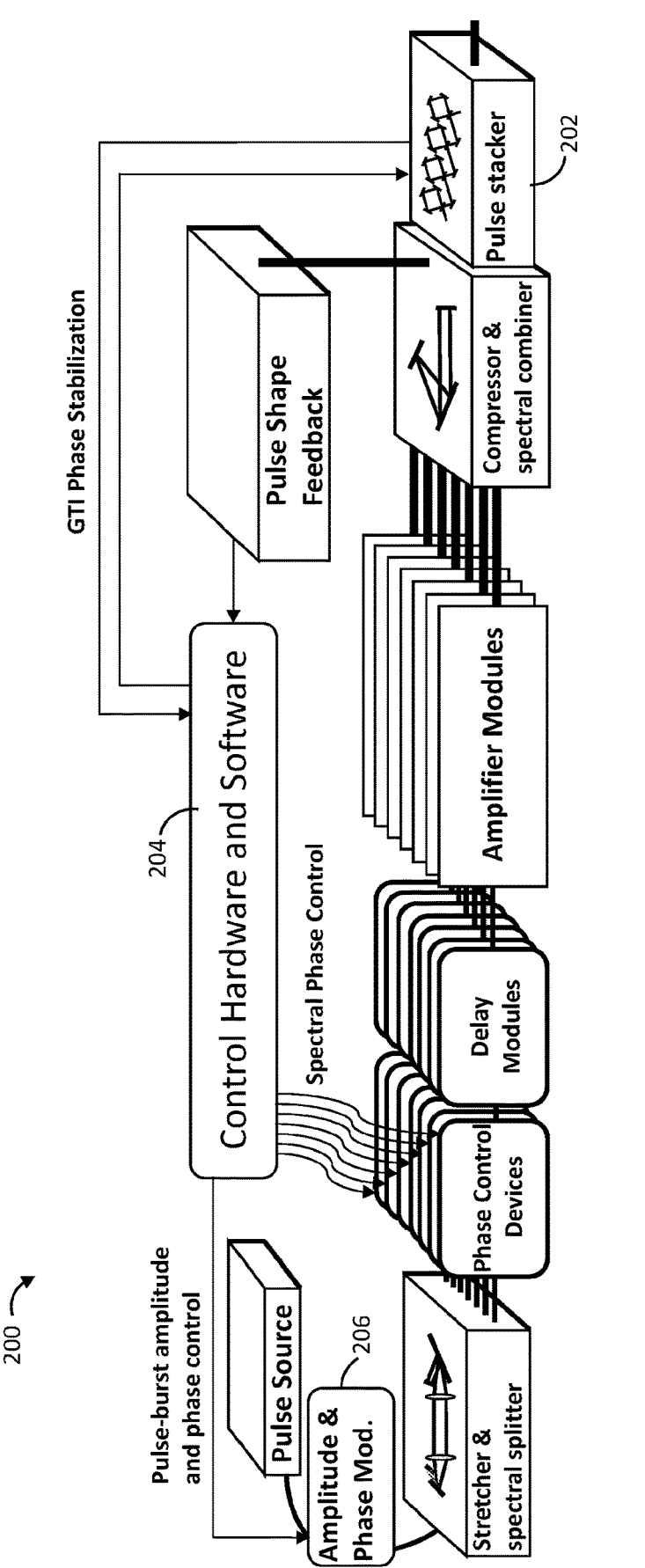
FIG. 2 is a schematic diagram of a laser system with pulse shaping via coherent spectral combination and pulse stacking in accordance with one example.

FIG. 2 depicts a laser system 200 in accordance with another example. The laser system 200 is similar to the laser system 100 (FIG. 1) in several respects. The laser system 200 differs from the example of FIG. 1 in that temporal combining of a pulse train (e.g., pulse stacking) is implemented to increase output energy. In this example, the laser 200 includes a pulse stacker 202, an active stabilization controller 204, and amplitude and phase modulation after the pulse source. In some cases, the modulation is provided by a pair of electro-optic modulators 206 configured to encode a stacking profile. The pair of electro-optic modulators 206 may be disposed between the signal source and the diffraction grating module.

The pulse stacker 202 is configured to generate output pulses via temporal combination of a pulse train at the output of the spectral combiner. Feedback is provided from the pulse stacker 202 (e.g., the output of the pulse stacker) to the controller 204 for phase stabilization (e.g., GTI phase stabilization, as further described below). In the example of FIG. 1, the phase stabilization control is directed to the pulse stacker 202 (e.g., in a continuous fashion in the time domain to achieve temporal combination of the pulse train). Feedback may also be provided to the electro-optic modulators 206 to optimize the pulse stacking process. The controller 204 and the feedback control provided thereby may be integrated with the controller and phase control functionality described in connection with the system of FIG. 1.

Figures 3A, 3B:
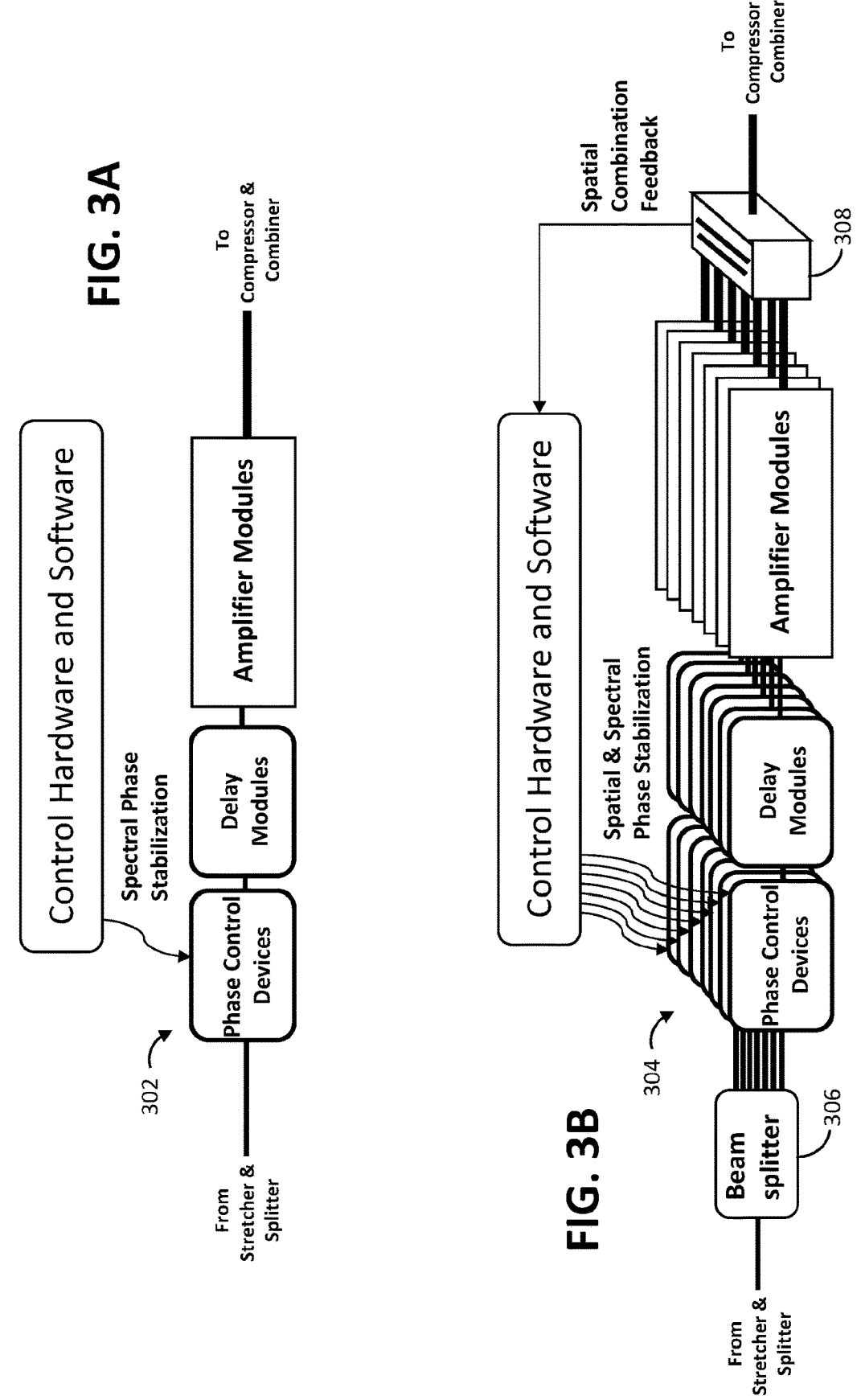
FIGS. 3A and 3B are schematic diagrams of an individual spectral channel of the laser system of either FIG. 1 or FIG. 2 in accordance with alternative examples.

FIGS. 3A and 3B depict examples of a spectral channel of the laser systems described herein. Each spectral channel of the laser system 100 (FIG. 1) or the laser system 200 (FIG. 2) may be configured as, or otherwise include, a single amplification chain 302, as shown in FIG. 3A, or an array 304 of parallel amplification chains (or sub-channels), as shown in FIG. 3B. The array 304 of parallel amplification chains are coherently combined by controlling the phase of each chain (or sub-channel), to increase the energy of the respective spectral channel. As described below, the parallel amplification chains may be useful in connection with a center or main channel. The side channels surrounding the main channel may then be amplified separately via respective single amplification chains, as shown in FIG. 3A.

As shown in FIG. 3B, a beam splitter 306 may be used to support a splitting array (e.g., fiber array) to generate a sub-array of channels for a central (and/or other) band of the plurality of spectral channels. A beam combiner 308 may then be coupled to the power amplifier array to spatially combine the amplified sub-array of channels. The splitting array may thus include an array of fiber amplifier modules as shown. In some cases, the array of fiber amplifier modules are monolithically integrated.

Figure 4:
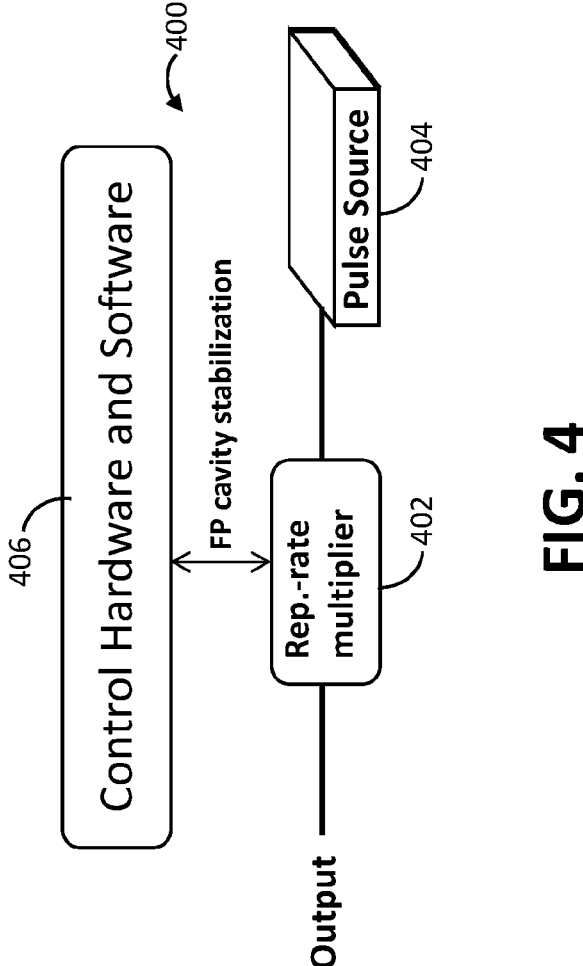
FIG. 4 is a schematic diagram of a pulse source of the laser system of either FIG. 1 or FIG. 2 in accordance with one example.

FIG. 4 depicts a pulse source 400 in accordance with one example. The pulse source 400 may be used in any of the laser systems described herein, including, for instance, the laser system 100 (FIG. 1) or the laser system 200 (FIG. 2). In this example, the pulse source 400 includes a repetition-rate multiplier 402. For instance, and as described further below, the pulse source 400 includes an oscillator 404 and the repetition rate multiplier 402 coupled to the oscillator 404. In some cases, the repetition-rate multiplier 402 may be based on, or otherwise include, a Fabry-Perot cavity.

In some cases, and as described further below, the repetition rate multiplier 402 may be coupled to a mode-locked repetition rate oscillator of the signal source 400. The repetition rate multiplier 402 may be controlled by a stabilization controller 406. The stabilization controller 406 may be configured to control the repetition rate multiplier 402 in accordance with the temporal combination of the pulse stacker (e.g., FIG. 2). The stabilization controller 406 may include a processor and a memory with instructions executed by the processor to implement the stabilization control. The stabilization controller 406 may be integrated with other feedback controllers of the system to any desired extent. Further details regarding the stabilization control are provided below.

Figure 5:
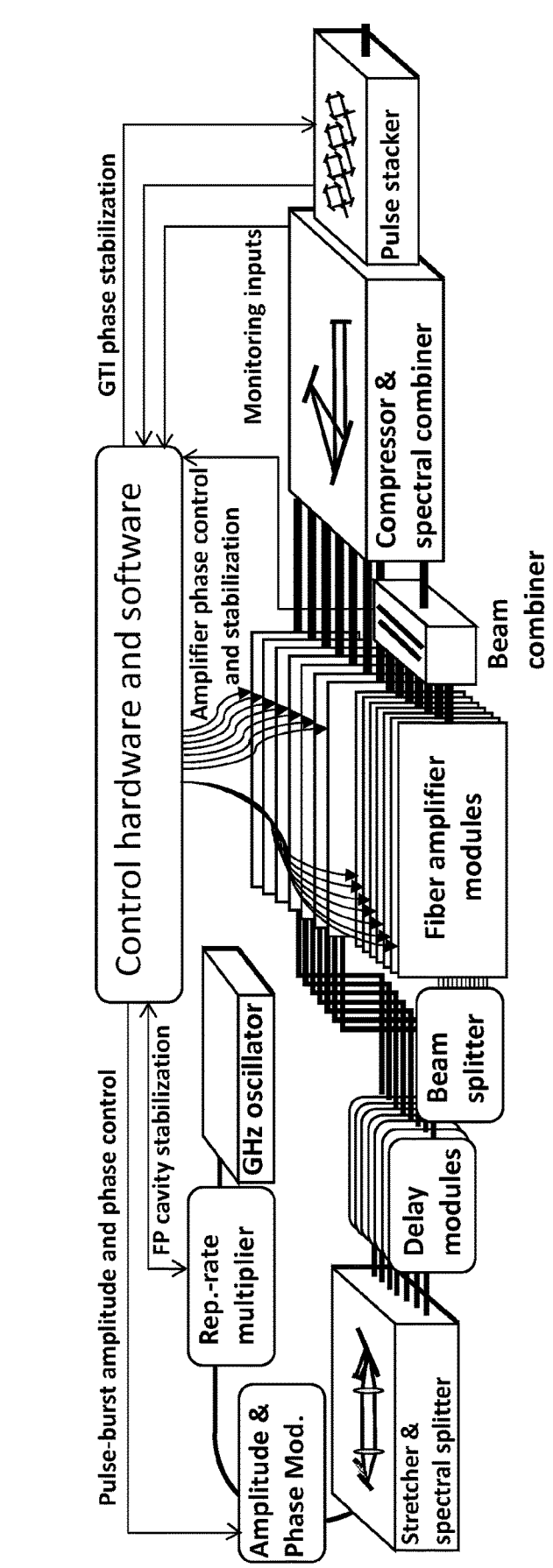
FIG. 5 is a schematic diagram of a laser system in accordance with one example.

FIG. 5 depicts a laser system 500 having a laser driver architecture in accordance with one example. The laser driver architecture includes a spatially, spectrally, and temporally coherently combined fiber CPA array. Instead of increasing pulse energy through increasing transverse-aperture size of a single laser, the laser architecture exploits coherent multiplexing of signals in spatial, spectral and temporal domains to synthesize a high-energy pulse beam from a multitude of much smaller apertures, to overcome power, energy, and spectral limitations of individual lasers. The laser architecture also uses an array of fiber amplifier modules, together achieving monolithic integration of a complex laser system.

In some cases, one or more components of the laser system 500 of FIG. 5 may be realized as or otherwise include an integrated rack-mount assembly. For instance, the multiple fiber-optic modules of the laser system 500 and one or more components upstream thereof may be integrated in a rack-mount assembly. Each module may include a respective circuit board.

The fiber technology enables compact, efficient and power scalable laser drivers. More specifically, spatial (as well as spectral) beam combining allows increasing cumulative average power and pulse energy linearly with the number of parallel amplification channels in the array. Time-domain pulse combining (coherent pulse stacking amplification (CPSA) allows increasing pulse energy per fiber-amplification channel by approximately two orders of magnitude compared to using CPA alone, thus reducing the required array size. The CPSA technique is useful here, because it allows reducing array size from approximately $10^3$-$10^4$ parallel channels (a formidable technological challenge) down to approximately 100 channels—a much more practical size. In such an array, each fiber amplification channel would produce approximately 100-500 W of average power, and approximately 10 mJ-30 mJ of pulse energy, which is within the achievable range for current large-core fiber technology.

The laser driver includes a coherently combined array structure. The array structure uses spatial, spectral, and time-domain coherent combining to enable the high pulse energies at kilohertz repetition rates (i.e. at multi-kilowatt average powers). The laser architecture also uses coherent spectral combining to synthesize the prescribed flat-top pulse shape for efficiently generating mono-energetic scattered photons.

The disclosed laser systems may be configured for generation of flattop pulses, e.g., for efficient generation of quasi-mono-energetic gamma rays. In some cases, the scattering laser pulse, which collides with the electron beam, has a duration in a range from about 1 to about 10 ps, is bandwidth limited, and is a flattop pulse with the shortest possible rising and falling times, in order to achieve near-mono energetic energy spread of the scattered photons. These aspects of the desired pulse present a twofold technical challenge. First, a 1 to 10 ps bandwidth limited pulse duration for approximately 1 J energy extraction means that there is a challenge in stretching/compressing these pulses for implementing CPA. Without the architecture of the disclosed laser system, this involves approximately more than 10 meter long pulse stretchers/compressors, making such systems highly impractical. Second, flat-top pulses with very short rising and falling times have spectra with most of the power concentrated in a very narrow spectral range (e.g., within approximately 0.3 nm to 3 nm, corresponding to 10 ps-1 ps bandwidth limited pulses respectively). However, fast rise and fall times are associated with much wider spectral features, containing a relatively small fraction of the total signal power. The combination of these two aspects makes it extremely challenging to amplify such signals in a standard CPA amplifier configuration, because it would involve even longer pulse stretchers/compressors, which would be providing about 1 ns stretching for the main spectral "peak", while also accommodating the broad spectral range of the total signal.

These challenges are addressed by using coherent spectral combining in a CPA amplifier array. The second challenge is addressed by splitting the total broad spectrum into much narrower spectral slices, and amplifying each individually in separate parallel amplification channels. Signals for each parallel channel may be stretched/compressed individually. However, a single stretcher and a single compressor, which may be modified to accommodate several different spectral slices, may instead be used. The first challenge, large stretcher/compressor size, may be mitigated by using the CPSA technique to extend pulse stacking by another factor of about 10. For example, stretching and compressing of the above specified narrow-bandwidth pulses of approximately 100 ps in stretched duration (instead of approximately 1 ns required by a conventional CPA) may be achieved with stretchers/compressors of less than one meter in length.

Flattop pulse synthesis. The signal bandwidth, and the corresponding number of parallel amplification channels each for an individual spectral slice, depends on two factors: the ratio between the pulse duration and its rise/fall duration $T_p/T_f$, and the magnitude of allowable peak-intensity ripple on the flattop pulse P. The ratio $T_p/T_f$ is approximately equal to the number of spectral slices. The magnitude of the peak-intensity ripple is determined by the finite spectral width of the total amplified/synthesized signal. Because the majority of the signal power is concentrated in the narrow-band central feature of the signal spectrum, the practical number of spectral slices is not much higher than approximately 10, which provides with a certain trade-off between the ratio $T_p/T_f$ and the peak-intensity ripple magnitude P. In some cases, the main spectral peak of the signal contains approximately 90%-95% of the total signal power. Consequentially, the coherently combined fiber CPA array may include a spatially-combined sub-array for amplifying this main spectral peak of the signal, and constituting the bulk of the total array, and of several spectrally-combined individual channels, constituting a fraction of less than 10% of the total number of channels in the array.

Further details are provided below regarding the laser driver architecture and the manner in which coherent spatial, spectral, and time domain (coherent pulse stacking) combining techniques are implemented.

Figure 6:
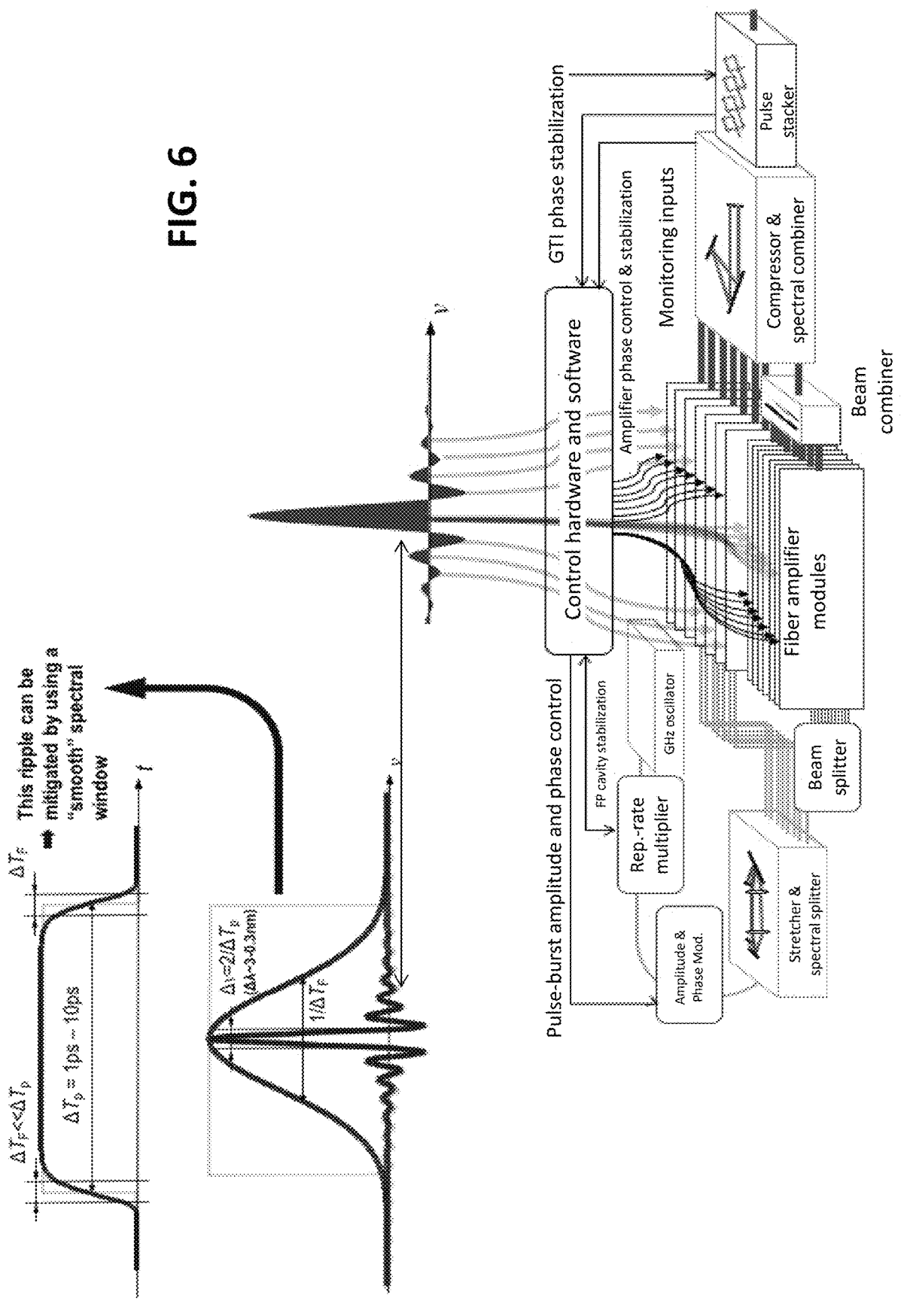
FIG. 6 depicts a schematic diagram of a fiber laser array for spectral synthesis of a flat-top optical scattering signal in accordance with one example.

Further details regarding coherent spectral combining (CSC) are now presented in connection with FIG. 6. As was described above, generation of the mono energetic MeV photons motivates use of a nearly flat-top pulse. However, due to practical spectral bandwidth limitations any real optical signal will have finite rise and fall times. Furthermore, abrupt spectral bandwidth cuts would lead to an intensity ripple at the top of this signal. These considerations lead to a spectral-synthesis design, one example of which is shown in FIG. 6. The signal spectrum is derived from an idealized Sinc function by properly filtering its spectral content using a "soft-edge" spectral window. The spectral synthesis may be achieved by splitting the gain spectrum into several separate channels and then combining them coherently (i.e., with a constant prescribed phase difference). Such coherent spectral combining (CSC) exploits independence between parallel channels to amplify different spectral slices in different channels in order to obtain a required spectrally-synthesized signal at the output. CSC and coherent beam combining (CBC) arrays may be simultaneously present in a fiber laser array. For instance, each spectral channel may be CBC combined individually from a number n of identical Fiber Chirped Pulse Amplification (FCPA) channels, whereupon a number m of different spectral channels may be coherently-spectrally combined, for a total of N=m×n parallel FCPA channels.

FIG. 6 depicts an example of spectral synthesis for a flat-top optical scattering signal showing smooth-window modulated sinc-shaped spectrum, and the corresponding flattop pulse in the time domain. FIG. 6 also illustrates how this spectral synthesis may be implemented in a fiber laser array. Note the lines connecting spectrum to the corresponding fiber-array sections, which emphasize that the central spectral band contains most of the energy, and therefore is amplified in a spatially-combined fiber array, while each side band may be amplified in a single channel. All spectral channels are combined spectrally before pulse stacking arrangement at the system output.

One example implementation of CSC for the scattering-laser design is based on the observation that each "oscillation" of the sinc function shown in FIG. 6 naturally constitutes a separate spectral channel. As shown in FIG. 6, each channel may be amplified either in a single channel, or in a group of parallel amplification channels. The main "peak" of the sinc function contains approximately 90-95% of the total pulse energy, and therefore is amplified in a group of parallel amplification channels, as shown in the schematic diagram of FIG. 6. Each of the other channels may be amplified in an individual fiber amplifier.

Implementing the spectral splitting and spectral combining arrangements presents challenges. One challenge is associated with the widths of each spectral channel being very narrow (e.g., 0.15 nm to 1.5 nm for 10 ps to 1 ps flattop pulses respectively). Addressing this challenge involves optical filters with edge sharpness to be a fraction of this width—a nearly impossible challenge for any multilayer-coating based optical filter design. The disclosed laser system utilizes a very different solution. The disclosed laser systems instead exploit the fact that there is a very strong spatial chirp produced in diffraction-grating based pulse stretchers and compressors, which can be exploited in certain spatial arrangements to produce very sharp-edge spectral features. As is described in more detail below, a combined diffraction grating based spectral splitters/pulse stretchers and, correspondingly, spectral combiners/pulse compressors, may be used.

Further details regarding the coherent pulse stacking amplification (CPSA) are now provided. As described above, the coherent time-domain pulse combining technique is primarily used for increasing pulse energy by at least two orders of magnitude per fiber amplification channel, and thus reducing fiber-array size by the same factor to enable compact high power and energy laser drivers. The technique uses passive optics (e.g., no gain) at the output to achieve pulse stacking. Coherent pulse stacking of amplified long pulse bursts is achieved at the system output at high powers in an arrangement of passive reflective cavities by exploiting constructive and destructive interference effects. Long pulse bursts reduce peak power, and thus nonlinear limitations in power fiber amplifiers, and consequentially nearly all the stored pulse energy may be extracted. The stacking process is controlled at the low-power input end via fast electro-optical modulators. Stacking stabilization is achieved by controlling the pulse stacker.

CPSA is based on two realizations, namely that (1) a properly arranged sequence of N equal-length Gires-Tournois Interferometer (GTI) cavities can stack a prescribed-amplitude burst of about 2N pulses, and that (2) various arrangements of a small number («N) of multiplexed-length GTI cavities can also be devised to stack a large number of pulses. For example, 8 multiplexed GTI cavities arranged in a 4+4 configuration (with L and 9L long cavities in each set respectively) can stack 81 prescribed-amplitude pulses (see, e.g., the example of FIGS. 7A and 7B), but other multiplexed-length configurations stacking different numbers of pulses are also possible. Because this technique involves coherent combining, the technique includes active feedback and stabilization of all the stacking GTI cavities to a certain prescribed and fixed round-trip phase value.

FIG. 7A depicts an example CPS arrangement having a cascaded 4+4 GTI configuration with 1 GHz oscillator seed, as well as a plot of the result of stacking 81 pulses into a single pulse at the system output. The example and/or other CPS arrangements may be incorporated in the disclosed laser systems as described herein.

Robust stabilization over extended periods of time may be achieved in connection with pulse stacking (e.g., stacking of an 81-pulse burst). For instance, peak power fluctuations in the stacked pulse on the order of about 1% have been achieved. High energy CPSA using a fiber amplification channel with nearly complete stored-energy extraction at record-breaking pulse energies (e.g., about 10 mJ) have also been achieved. In that case, pulse compression was down to approximately 500 fs, as shown in the FIG. 8. This has proven the expected energy improvement compared to CPA by approximately two orders of magnitude (from about 100 μJ available with CPA). This result establishes that a much smaller array size may be used for reaching combined pulse energies of about 1 J. With 10 mJ per channel, approximately a 100 channel array may be used, instead approximately $10^4$ parallel channels if a CPA-only approach were to be used.

Further details regarding addressing the trade-off between chirped pulse amplification (CPA) and coherent spectral combining (CSC) implementations are now provided. As described herein, use of the pulse stacking technique allows us to overcome the trade-off between CPA and coherent spectral combining. This trade-off is expressed in the fact that spectral splitting of a stretched pulse into N channels results in the corresponding shortening (by the same factor of N) of the stretched pulses in each spectral channel. For example, for a 10 spectral channel system, an initial stretched pulse of 1 ns duration will be reduced down to approximately 100 ps duration. This increases intensity for a particular energy, and because nonlinear effects at high intensity limit laser amplifier energy, this leads to a proportional decrease in achievable pulse energy at the system output.

FIG. 9 shows how use of the CPSA technique overcomes this trade-off. In this case, the initial pulse repetition rate in increased from 1 GHz to 10 GHz. Then, after stretching to 1 ns and spectral splitting into 10 channels (for this example), each channel will see a quasi-continuous sequence of 10 "spectrally-truncated" chirped pulses, each about 100 ps long, but all together "filling in" the "original" 1 ns time slot, as illustrated. To implement the solution, an additional factor of 10 is added in pulse stacking. However, at 10 GHz the required additional stacking arrangement is very compact in size.

FIG. 9 thus depicts how the trade-off between CPA and coherent spectral combining is overcome by employing high repetition rate pulse train, with the repetition period equal to $\Delta T_{stretched}/N$, where N is the number of spectral channels. In portion (1) of FIG. 9, a solitary ultrashort pulse is stretched into a chirped pulse with the duration $\Delta T_{stretched}$ and is then spectrally split into N channels, pulse duration in each channel being reduced down to $\Delta T_{stretched}/N$. Portion (2) of FIG. 9 shows that when a pulse train with repetition period equal to $\Delta T_{stretched}/N$ is stretched, and then spectrally split into N channels, effective pulse duration in each channel remains $\Delta T_{stretched}$ because it now consists of N identical chirped "slices" corresponding to the spectral width of each spectral channel.

Further details regarding high repetition rate pulse train generation are now provided. Multiple techniques for generating a 10 GHz pulse train are available. One technique involves a mode locked oscillator that operates at 10 GHz repetition rate. However, the design options for such an oscillator are rather limited, resulting in limited output powers, pulse energies, pulse spectral width and duration. Another alternative uses a 1 GHz mode locked oscillator, then multiplying its repetition rate to the desired 10 GHz. This can be accomplished using a Fabry-Perot (FP) resonator. Such repetition rate multiplication is used in so-called astro-combs, where much higher multiplication factors have been achieved. Simulations revealed that there are certain trade-offs associated with designing such a repetition-rate multiplier. On one hand, it is desirable to use higher finesse FP cavities, since they produce less amplitude modulation on the top of the repetition-rate multiplied pulse train. However, due to finite dispersion of the FP cavity mirrors, there is a certain amount of cumulative dispersion accumulated after multiple round-trips in the cavity, which results in the spectral narrowing and, consequentially, an increase in the transmitted pulse duration.

Numerical simulations revealed that repetition-rate multiplication from 1 GHz to 10 GHz may be effectively achieved with an air-etalon type Fabry-Perot cavity, with the cavity finesse of 200, and with multilayer-dielectric coatings with the dispersion of about 100 fs². This results in power transmission of about 8%, in peak-power modulation by approximately 20%, which is acceptable because of compensation with an EOM amplitude modulator), and with the spectral bandwidth exceeding approximately 30 nm, which is more than sufficient.

The above-described techniques are now described in connection with examples of the disclosed laser systems for Thomson scattering.

Spectral Synthesis Requirements for Flattop Pulse Synthesis. As described above, a scattering laser may generate a scattering optical pulse having a length of about 1 to about 10 ps with a flattop, and being near bandwidth limited. These parameters are driven by the fact that efficient generation of quasi-mono energetic MeV photons via Thomson scattering is achieved when both intensity and carrier frequency of the optical pulse are constant during the laser pulse—electron-beam interaction. Described below is how these parameters on the scattering pulse format translate into the spectral properties of the laser pulses, and consequentially translate into the configuration of the spectral combining system.

FIG. 10 depicts an ideal scattering driving pulse, i.e., a bandwidth-limited square pulse with infinitely abrupt rise and fall times, and the corresponding Fourier transform of the square pulse, i.e., a sinc function. The ideal pulse also has a constant intensity. Constant intensity means that the pulse has a perfect flattop square pulse $\Pi(t)$ with an example duration in the $\Delta T_p = 1\text{-}10$ ps range. This pulse has (an idealized) infinitely abrupt rise and fall times of $\Delta T_F = 0$. Constant carrier frequency means that the signal should be bandwidth-limited. Therefore, the spectrum of a bandwidth limited perfect-square pulse is obtained by taking its Fourier transform into the frequency domain, and is a sinc function $sinc(\pi \Delta Tp(v-v0))$. The width of the central spectral band is k $\Delta v = 2/\Delta T_p$, and is solely determined by the required duration of the flattop pulse. For 1-10 ps pulses, it should be in the range $\Delta\lambda$ of about 3 to about 0.3 nm. Note that the majority of the signal energy is contained within that spectral band.

Infinitely abrupt rise and fall times are non-physical, since they require an infinitely broad spectrum of the sinc function. Any real system has certain bandwidth limitations, and is capable of supporting only a finite spectral window. For example, the spectral window width may be defined or otherwise established by the diffraction-grating stretcher and compressor. For instance, it is determined by the diffraction-grating width, which translates to some finite width "hard-edge" spectral window. In the spectral domain this window can be represented by a step function $\Pi(\Delta T_F(v-v_0))$ characterized by its width $\Delta v = 1/\Delta T_F$, as shown in FIG. 11. This finite-width $\Delta v$ spectral window produces finite rise and fall times $\Delta T_F$ of the corresponding pulse in the time domain (FIG. 11), which are inversely proportional to the width of the spectral window, as shown by the formula above.

However, an abrupt-edge spectral filtering produces an undesired side effect—an intensity ripple at the top of the flattop pulse, as is illustrated in FIG. 11. This undesired intensity ripple may be mitigated by using a smooth spectral window instead of the abrupt one, as illustrated in FIG. 12. In that case, the fall and rise times of the pulse are now defined by the inverse of the FWHM of this spectral window $\Delta v = 1/\Delta T_F$, not the width between the "hard" edges caused by, for example, diffraction-grating edges. Note that the ripple amplitude remains finite for any finite spectral-window width, but its magnitude decreases with increasing spectral width of a bell-shaped "soft" spectral filter.

Variation of laser intensity both due to the finite pulse rise and fall times and to the ripples in the flat top will degrade the mono-chromaticity of the generated Thomson photons. It is therefore imperative to maximize the width of the spectral window within which the scattering-pulse is synthesized. This, however, leads to certain design trade-offs for the laser system. Indeed, because the specified duration of the flattop pulse fixes the spectral width of the central band, increasing the spectral window means that this central band will occupy a decreasing fraction of the total spectrum. First of all, this produces a major challenge for pulse stretchers and compressors, which would be unacceptably large both in terms grating-to-grating separation (on the order of tens of meters), and in terms of the grating size (on the order of a meter). As described above, this challenge is resolved by employing the CPSA technique. Furthermore, the other challenge associated with increasing the spectral window is due to the fact that, as is evident from FIG. 10, power that is contained in a side-band is rapidly decreasing with the increase of its spectral "distance" from the central band. When considering a bell-shaped "soft" spectral window of FIG. 12, this decrease is particularly rapid, being faster than exponentially-decreasing function of the frequency separation $v-v_0$ from the center frequency $v_0$. This means that the practically achievable width of spectral window is limited, because for a sufficiently large $v-v_0$ each spectral channel contribution becomes negligible, and thus not practically achievable.

Spectral synthesis is configured to account for pulse shaping and bandwidth trade-offs. Numerical analysis indicates that the maximum number of channels in practice may not exceed approximately 10-20 channels (i.e., a central channel, and 4 to 9 side-lobe pairs).

FIG. 13 depicts an example of an example spectral-signal design choice. The lower part of FIG. 13 shows the synthesized spectrum, which includes a sinc function, characterized by the (adjustable) central-band spectral width of $\Delta v_c = 2/\Delta T_p$ (where $\Delta T_p = 1\text{-}10$ ps), which is abruptly truncated by the "square" filter with $\Delta v_{step} = 17/\Delta T_p$ width (corresponding to $\Delta\lambda = 30$ nm-3 nm spectral transmission), and is also multiplied by a smooth Gaussian widow with the FWHM of $\Delta v_{soft} = 10/\Delta T_p$. The blue-solid filled sections in this graph indicate separate spectral channels. Note that all the side lobes have equal spectral widths, which are all equal to the half of the central-channel spectral width. There are 9 side-lobe channels on each side of the central channel (i.e. total of 20 channels). The top part of FIG. 13 shows the time-domain picture of the corresponding flattop pulse. Pulse rise and fall times are $\Delta T_F = \Delta T_p/10$, and therefore are defined by the width of this Gaussian window. Pulse-top peak power ripple was calculated to be about 1.2%. There is a corresponding trade-off between the widths of the "abrupt" and "soft" spectral windows—increasing $\Delta v_{soft}$ while keeping $\Delta v_{step}$ fixed, reduces rise and fall times, but increases the ripple. Attempting to increase both $\Delta v_{soft}$ and $\Delta v_{step}$ simultaneously is not practically feasible, due to the negligible power contained in the spectral channels beyond the "edges" of the "abrupt" spectral window.

FIG. 14 depicts an example of the fiber laser array architecture of the disclosed laser systems. In this example, a coherently combined laser array is configured to produce a scattering flattop pulse with an energy of about 1 J at a repetition rate falling in a range from about 1 kHz to about 50 kHz. As described below, one or more aspects of the array are configured for combining in spatial, spectral, and time domains. The system starts with a mode-locked repetition rate oscillator (e.g., about 1 GHz), followed by a repetition rate multiplier (e.g., about 10 GHz, based on a Fabry-Perot cavity), and a pair of fast electro-optic (EO) modulators (phase and amplitude) to "encode" the required stacking profile. Together with a coupled single mode fiber preamplifier, this constitutes a signal source module, whose function is to generate the desired format pulse bursts for achieving time-domain combining for the system output. This source is followed by a preamplifier module, which contains a couple of single mode fiber amplifiers and acousto-optic modulators to achieve the desired pulse energies in the repetition-rate down-counted stacking bursts. The preamplifier is followed by a diffraction grating arrangement in which the pulses are simultaneously stretched, and split into individual spectral channels. In this particular example, there are 17 spectral channels: one central-band, and 16 side-band channels, each spectral channel presenting a corresponding component of a (modulated) sinc function, as described in the signal synthesis section.

Spatial beam combining is only implemented for the high energy, central-band spectral channel. In the example of FIG. 14, there is one central band and eight pairs of side-lobe spectral channels. The table below shows the numerically calculated relative energy distribution between different channels:

| Spectral band No. | Energy, % |
|---|---|
| 1 | 94 |
| 2 & −2 | 2.2 |
| 3 & −3 | 0.59 |
| 4 & −4 | 0.2 |
| 5 & −5 | 0.075 |
| 6 & −6 | 0.027 |
| 7 & −7 | 0.009 |
| 8 & −8 | 0.001 |

In the column for spectral band numbers, "1" refers to the central band. The individual side bands are labeled with progressively increasing side-band order as "2" an "−2", "3" and "−3", etc.

The central-band channel contains majority (94%) of the total energy (e.g. about 1 J final pulse energy). All other spectral channels in principle may provide their much lower required energies using one or possibly two amplification channels. Channels 2 and −2 at 22 mJ per channel are at the upper limit for a single large-core fiber energy extraction. The central-band channel may require approximately 100 spatial channels, each producing up to about 10 mJ per channel, at 1-50 kHz repetition rate, and all combined with a single spatial-beam combiner. These energies from a single fiber amplification channel may be achieved with the CPSA technique with a large-core effectively single-mode fiber— so-called chirally-coupled-core (CCC) fibers, e.g., with the demonstrated core diameters of up to 85 μm.

As shown in FIG. 14, the entire fiber amplifier array may be monolithically integrated. Such integration reduces alignment complexity compared to existing systems. The output of this array, however, is combined in spatial, spectral, and time domains using free space optics in order to handle high energies and peak powers generated there.

Further details regarding the spectral splitting/stretching and combining/compression are provided below.

As outlined above, coherent spectral synthesis of the flattop pulses is challenging with the conventional CPA approach. FIG. 15 illustrates the problem. FIG. 15 shows a conventional diffraction-grating based Treacy-type pulse compressor with a standard-sized grating of about 10 cm width (in the direction of the diffraction plane, which is perpendicular to the grating grooves). The top view shows that an incident broad-band signal beam gets diffracted into a horizontally-chirped beam after the first grating. To achieve maximum stretched-pulse duration, the transverse aperture of the second grating needs to be completely filled, as shown. The 10 cm aperture provides about 1 ns of delay between the "blue" and "red" edges of the spatially chirped broadband signal, provided there is a sufficiently large distance between the two gratings. This distance is proportional to the signal bandwidth. For reference, a 10 nm bandwidth signal (as approximately required for envisioned spectral window size)) at the 1 μm center wavelength would require approximately 1 m separation between the two gratings to achieve this approximate 1 ns delay/stretched pulse duration.

After the second grating, the spatially diverging chirped beam becomes collimated in the diffraction plane. This beam can be folded back with a roof mirror for a second pass through the grating pair. To separate this folded beam from the incident one, the roof prism translates the folded beam downward, as illustrated in the side view of FIG. 15. After the second pass through the grating pair, this spatially chirped beam is recombined into the original diffraction limited beam, which as is illustrated in the top view, and constitutes the output of this pulse compressor. The pulse stretcher instead is configured according to the Martinez scheme, but with exactly the same grating size and separation considerations as above.

The problem is that, as discussed above, the majority of the signal (>90% corresponding to >900 mJ) for synthesizing a flattop pulse is contained in a small fraction of the total spectral bandwidth, equal to the ratio $T_F/T_p$, which should be in the range from $\frac{1}{10}$ to $\frac{1}{20}$ of the total bandwidth. This means that in order to maintain, for example, a about 1 ns stretched pulse duration for this central band with >90% of the total energy, both the grating size and grating separation increase by the factor $T_p/T_F$, i.e., by 10 to 20 times. This would bring the grating separation into a range of about 10 s meters, and transversal grating size into range of about 1 to 2 meters—a practically unacceptable limitation.

FIG. 16 illustrates a solution configured in accordance with one example. In this example, a Treacy type grating configuration is shown for simplicity, and pulses are shown being stretched and spectral channels being spatially separated. Pulse compression and simultaneous spectral-combining may be achieved by reversing the beam propagation directions in FIG. 16. Exactly the same arrangement may be achieved with a Martinez type grating configuration. Indeed, in other cases, Treacy's configuration may be used for pulse compression, and Martinez's for pulse stretching. This solution has two aspects: an incident pulse repetition rate increased by the factor $T_p/T_F$, and pulse compression/stretching integrated with the spectral combining/splitting within the proposed arrangement. The increase in the pulse repetition rate, when used in conjunction with the CPS technique, allows the solution to retain the grating size and separation defined by the total (broad) spectral bandwidth, not just by the (narrow) width of the central spectral band, i.e. it allows use of standard about 10 cm gratings with the grating separation effectively less than about 1 m. The integration into this arrangement of the spectral splitting/combining achieves two objectives. First, it complements the above high-repetition rate solution by spatially separating/combining different spectral channels. Second, it exploits the spatial chirping of the beam in certain places of the arrangement to achieve high-precision/narrow-bandwidth spectral beam splitting/combining.

Spectral "processing" is performed with the collimated spatially-chirped beam within the folding roof mirror. An example of combining pulse stretching and spectral splitting is shown in FIG. 16. As illustrated in the side view, the bottom-part of the vertically-shifting mirror is configured to shift different spectral channels to different vertically-shifted output beams. As the top view shows, each such beam is individually reconstituted into an unchirped beam at the "output" of the shown arrangement. Because the repetition rate at the "input" is increased by the factor $T_p/T_F$, and the stretched duration for each spectral band is reduced by the inverse of this factor $T_F/T_p$, the resulting time-domain signal in each "output" beam contains a quasi-continuous sequence of pulses, as shown in the top view, thus retaining the advantage of long stretched pulses without sacrificing grating size or separation.

Further details regarding optical feedback for the spectral synthesis of flattop pulses are now presented.

One of the technical problems associated with spectral synthesis is how to organize suitable feedback to inform an electronic control system, which has to set correctly the phases of the different spectral channels in order to achieve the required bandwidth-limited flattop pulses with durations 1-10 ps. In the spectral domain (see FIG. 13), this means that the required temporal shape of the pulse is achieved when all adjacent spectral channels are out of phase (i.e., there is a t phase shift between adjacent channels). If the phases of each spectral channel are different from this prescription, the resulting temporal shape deviates significantly from the desired flattop pulse. Setting up an ultrafast time-domain measurement on a few picosecond scale, or, alternatively, a spectral-domain measurement of the phases of the different channels is technically very daunting. In the coherent pulse stacking technique, or in spatial beam combining, the feedback signal may generally come from maximizing either the peak or the average power respectively. In the case of the flattop pulse synthesis, neither of these metrics may be used, because the average power is not affected, and the flattop pulse has a peak power which in general is lower than many other pulse shapes that may be produced with different channel phases. Further complication comes from the fact that the spectrum is dominated by the central channel, which contains more than 90% of the total pulse energy, which means that changes due to changing phases of other channels can be relatively minor, reducing the contrast range of a peak power measurement.

To address this design problem, properly configured non-linear interactions are used to produce the required feedback signal. This signal then may be processed by using a suitable algorithm to set and keep the spectral channel phases at the correct values. This feedback-signal engineering is achieved in two ways: by minimizing a Second Harmonic Generation (SHG) signal from a crystal, and by modifying the monitor signal spectrum in order to increase the contrast range of the reading.

By changing the phases of each channel, the average power remains constant but the pulse profile changes, and therefore the peak power changes. This indicates that the Second Harmonic Generation (SHG) may be used as a feedback metric. Numerical analysis results on second-harmonic generation by a pulse produced at the output of the spectral combiner/pulse compressor are shown in FIG. 17. This simulation explores dependence of the SHG signal magnitude as a function of the relative phases between different spectral channels. A specific system was considered here as an example, which synthesizes a 1-ps long flattop pulse, and which consists of five spectral channels—one central lobe (3-nm wide), and four side lobes (each is 1.5-nm wide), see, e.g., FIG. 13. As also shown in FIG. 13, the desired/target phases of the lobes are 0, π, 0, π, 0. Because the relative phases are of interest, the four phases of all the side lobes relative to the central lobe are considered. The corresponding phase deviations from the target phase for each side-lobe are denoted as $\delta_1$, $\delta_2$, $\delta_3$, $\delta_4$, as indicated in FIG. 13. By changing the crystal length, the width of the phase matching bandwidth of SHG is also changed. To produce a global minimum at the desired point of operation, the phase-matching bandwidth half-width is wider than half of the total spectrum, e.g., wide enough such that the central lobe of the phase-matching sinc function encompasses the entire signal spectrum.

As an example of this aspect, numerical simulations were performed in the four-dimensional phase-parameter space of the side-lobe phase deviations $\delta_1$, $\delta_2$, $\delta_3$, $\delta_4$. The simulations revealed a dependence with crystal length. Because a four-dimensional parameter space is being analyzed, only two-dimensional "slices" of the results are shown, however all operation points have been simulated and analyzed. Because the inner lobes, $\delta_2$ & $\delta_3$, are the most important, plots of their phase dependence will be used, however the outer lobes behave in a similar manner to the inner ones. FIG. 17 shows the SHG intensity produced for varying inner lobe phase with a crystal length of 5-mm and 1-mm. The desired point for the inner lobes is found at the center of the graph, when $\delta_2=\delta_3=\pi$. When the crystal length is too long, this point is a "saddle", or a minimum in one direction and a maximum in the orthogonal direction. This is due to the phase matching bandwidth not encompassing the entire spectrum. However, if the crystal length is reduced, then the desired operation point is found to be the global minimum, meaning this signal may be minimized to achieve a flat-top pulse.

While a feedback solution has been found, because over 90% of the total energy is stored in the central lobe, the peak power is rather insensitive to the phase changes of the other lobes. Indeed, the contrast of the maximum and minimum SHG intensity for adjusting the inner lobes is 0.82 (i.e. maximum signal variation is within 18% of the total signal), and the contrast for adjusting the outer lobes is 0.986 (i.e. maximum signal variation is within 1.4% of the total signal). In order for this to be a viable feedback method, these contrasts are increased substantially. This is achieved by creating a feedback signal where each lobe's intensity is adjusted, such that the side lobes have a larger effect on the SHG intensity. Each lobe may be controlled individually; however one factor is that the main lobe power be reduced. FIG. 18 shows the SHG intensity of a 1-mm crystal with the central lobe damped by different amounts. For example, when the central lobe is damped to 1% of its original intensity, putting it on the same energy level as the other lobes, the contrast for inner lobes becomes 0.208 (i.e. maximum signal variation is within about 80% of the total signal) and the contrast for outer lobes becomes 0.680 (i.e., maximum signal variation is within 32% of the total signal) this makes it sensitive enough to be used as a viable feedback method.

Creating this feedback signal presents another set of challenges. The signal is taken after the compressor/combiner setup; however it must also alter the spectral profile quite substantially without perturbing the main output signal. Because the main lobe is 6-nm wide from zero intensity to zero intensity, this is a rather sharp spectral feature, so a spectral filter would be difficult to engineer. Instead, polarization control of each channel into the compressor/combiner may be used, as shown in FIG. 19. Each channel's polarization angle may be controlled such that the power going to each output after a polarizing beamsplitter is completely adjustable, enabling the creation of a customizable feedback signal. In one example, the central lobe polarization is rotated slightly, such that the majority of its power is still along one axis. The other channels are all rotated further, for example to 45°. Then, when the output of the compressor/combiner is incident on a polarizing beamsplitter, two different signals are created, where the power of each lobe is adjustable by rotating each input polarization. The amplitude of each lobe may also be controlled by adjusting the amplifiers before the compressor/combiner.

Aspects of the disclosed laser systems have been verified by experimental testing. The experimental work demonstrated the feasibility of the above-described pulse stretching/spectral splitting and pulse compression/spectral combining devices, and demonstrated the feasibility of the above-described spectral synthesis of the bandwidth-limited flattop pulses.

FIG. 20 depicts a laser system having a coherently-spectrally combined five-parallel channel fiber amplifier array in accordance with one example. The laser system includes a mode-locked 1 GHz repetition rate fiber oscillator, producing broad bandwidth (>30 nm) optical pulses at 1.045 μm central wavelength, which are coupled into a single-mode fiber based 1:5 splitter to seed the five-channel array. Each parallel channel starts with a fiber-pigtailed spectral slicer/pulse stretcher using a compact Martinez-type diffraction-grating arrangement (FIG. 21). Each slicer/stretcher produces an approximate 3 nm wide spectral slice, each stretched to about 100 ps duration. Each individual spectral slice is tailored in shape and central wavelength by using a suitably positioned spatial mask positioned in a Fourier plane of each corresponding slicer/stretcher. The tailoring is configured to produce a sinc-function shaped spectrum when all channels are coherently combined at the system output after the spectral combiner/compressor.

FIG. 21 depicts a stretcher of a channel in accordance with one example. Dashed lines represent beams that are displaced lower by the roof mirror. FIG. 21 also depicts a schematic diagram of a spectral slicer used in the stretcher, with adjustable filter angle and position.

Each parallel signal is amplified in a corresponding single-mode fiber amplifier, each including a PZT-based fiber length/phase modulator. Coherent synthesis of all five channels is achieved in a Treacy-type diffraction-grating based compressor/combiner, where five individual channels are spatially (and spectrally) combined into a single beam, while simultaneously each signal is compressed to bandwidth-limited duration. An example of the compressor/combiner is shown in FIG. 22.

The above-described examples have demonstrated spectral shaping and combining, with the measured spectral profile and calculated output pulse using this spectral profile shown in FIG. 21. The calculated pulse assumes correct phasing of the spectral channels, and results in a pulse duration of 1 ps with 4% ripple and a rise time of 0.27 ps. This is close to the best possible performance using five spectral lobes, with ideal synthesis being 3% ripple and 0.23 ps rise time. If the side lobes are removed and only Channel 3 is considered, the resulting pulse has a duration of 0.7 ps and a rise time of 0.47 ps. This validates the feasibility of the disclosed spectral synthesis approach.

Part of the output signal is used for providing a properly configured feedback channel, for coherently controlling each channel phase. Note the fixed t-phase shift between the phases of each adjacent spectral channel. Providing this feedback is a technical challenge, as described above. Following the described solution, a properly configured SHG crystal with a wide enough bandwidth may be used, for example a BBO crystal that is 1 mm in length. Minimization of the SHG signal resulting from this crystal achieves the t-phase shift between the adjacent spectral channels. Such feedback then may be used with any hill-climbing algorithm, such as, for example, Stochastic Parallel Gradient Descent (SPGD). A stabilization scheme may be implemented using an FPGA based digital control circuitry, which is completely programmable.

FIG. 22 depicts a photon generation system in accordance with one example. In this example, the photon source is configured for generation of gamma rays, and may thus be referred to as a gamma ray generator. The photon generation system is configured as a Thomson scattering photon source.

The photon generation system includes an electron beam generator configured to provide and accelerate electrons in the form of a beam as shown. The photon generation system further includes a laser driver. The laser driver may be configured in accordance with one or more of the laser systems described herein. Laser pulses generated by the laser driver are incident upon the electron beam, as shown, to generate the gamma ray through Thomson scattering.

Described above are examples of laser systems that may be used as power-scalable Thomson scattering laser drivers. The disclosed laser drivers use an innovative laser driver architecture, which is based on a spatially, spectrally, and time-domain coherently combined chirped-pulse-amplifier array. This architecture is a paradigm shift, in that it replaces an old notion of increasing pulse energy through increasing transverse-aperture size of a single laser, by a new notion of exploiting coherent multiplexing of signals in spatial, spectral and time domains to synthesize a high-energy pulse beam from a multitude of much smaller apertures, thus overcoming power, energy, and spectral limitations of individual lasers. Use of fiber technology, which is capable of achieving monolithic integration of complex laser systems, enables compact, efficient and power scalable laser drivers, including multiple standardized and integrated subsystem "modules". Spatial beam combining allows increasing cumulative average power and pulse energy linearly with the number of parallel amplification channels, and time-domain pulse combining (coherent pulse stacking amplification—CPSA) allows increasing pulse energy per amplification channel by up to approximately two orders of magnitude, thus reducing the required array size by a corresponding magnitude. As a result, the disclosed architecture enables generation of pulses for Thomson scattering with approximately 1 J per pulse, and at 1-50 kHz repetition rates with the array sizes containing only approximately 100 parallel amplification channels.

One aspect of the disclosed scattering laser is the use of coherent spectral combining for synthesizing bandwidth-limited flattop optical pulses, which are optimized for high-efficiency generation of quasi-monoenergetic gamma photons. Solutions to the challenges identified herein include use of CPS to mitigate CPA and the spectral combining trade-off, devices for simultaneous pulse stretching/spectral splitting or pulse compression/spectral combining, and an approach to construct a suitable optical feedback for the flattop pulse spectral synthesis.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A laser system comprising:
   a signal source configured to generate input pulses;
   a stretcher and splitter module configured to stretch and split the input pulses into a plurality of N spectral channels, each of the input pulses being stretched into a chirped pulse having a duration $\Delta T$, the duration being longer than a repetition period of the input pulses, the duration of the chirped pulse being split into a sequence of N identical, non-overlapping in time, chirped, spectral slices for each channel of the plurality of spectral channels;
   a set of phase control devices, each phase control device being configured for spectral phase control of a respective spectral channel of the plurality of spectral channels;
   a power amplifier array of amplifier modules, each amplifier module of the power amplifier array being configured to amplify a respective spectral channel of the plurality of spectral channels;
   a spectral combiner configured to spectrally combine the plurality of spectral channels via diffraction grating-based pulse compression; and
   a feedback controller coupled to the spectral combiner to provide feedback to the set of phase control devices for pulse shaping.

2. The laser system of claim 1, wherein the power amplifier array comprises an array of fiber amplifiers.

3. The laser system of claim 1, wherein:
   the signal source comprises a mode-locked repetition rate oscillator; and
   the laser system further comprises a pair of electro-optic modulators configured to encode a stacking profile, the pair of electro-optic modulators being disposed between the signal source and the diffraction grating module;
   the laser system further comprises a pulse stacker to generate output pulses via temporal combination of a pulse train provided by the spectral combiner.

4. The laser system of claim 3, wherein the signal source comprises:
   an oscillator; and
   a repetition rate multiplier coupled to the oscillator.

5. The laser system of claim 4, wherein the repetition rate multiplier is based on a Fabry-Perot cavity.

6. The laser system of claim 4, further comprising a phase stabilization controller to control the repetition rate multiplier in accordance with the temporal combination of the pulse stacker.

7. The laser system of claim 1, wherein delays experienced in each spectral channel of the plurality of spectral channels are equal.

8. The laser system of claim 1, further comprising a set of delay modules to introduce a respective delay in each spectral channel of the plurality of spectral channels, wherein each delay module of the set of delay modules modifies a path length of each spectral channel of the plurality of spectral channels.

9. The laser system of claim 1, wherein the power amplifier array is disposed to amplify each spectral channel of the plurality of spectral channels after the spectral control is provided by the set of phase control devices.

10. The laser system of claim 1, further comprising:
a splitting array to generate a sub-array of channels for a central band of the plurality of spectral channels; and
a beam combiner coupled to the power amplifier array to spatially combine the amplified sub-array of channels.

11. The laser system of claim 10, wherein the splitting array comprises an array of amplifier modules.

12. The laser system of claim 11, wherein the array of amplifier modules are monolithically integrated.

13. The laser system of claim 1, wherein each spectral channel of the plurality of spectral channels presents a corresponding component of a sinc function of the output pulses.

14. The laser system of claim 13, wherein the components of the sinc function are configured such that the output pulses are flattop pulses.

15. The laser system of claim 1, wherein the plurality of spectral channels further comprise 16 side-band channels.

16. The laser system of claim 1, wherein the spectral combiner comprises a grating having a Treacy configuration.

17. The laser system of claim 1, wherein the stretcher and splitter module comprises a diffraction-based stretcher and splitter module set up in a Martinez configuration.

18. The laser system of claim 1, wherein the spectral combiner is implemented in free-space optics.

19. A photon generation system comprising:
an electron generator configured to generate a beam of electrons; and
a laser driver comprising the laser system of claim 1, the laser driver being configured to direct pulses toward the electron beam such that photons are generated via incidence of the pulses upon the electron beam.

20. The photon generation system of claim 19, wherein the photons are generated via Thomson scattering.

21. The photon generation system of claim 20, wherein the laser driver is configured such that a gamma ray is generated via the Thomson scattering.

22. The laser system of claim 1, wherein the stretcher and splitter module is configured to split the duration of the stretched chirped pulse such that each identical, non-overlapping in time, chirped spectral slice of the sequence of N identical, non-overlapping in time, chirped, spectral slices has a duration equal to the duration of the chirped pulse divided by the number of channels in the plurality of spectral channels.

* * * * *